(12) United States Patent
Akimoto et al.

(10) Patent No.: US 7,248,741 B2
(45) Date of Patent: Jul. 24, 2007

(54) VIDEO SEQUENCES CORRELATION AND STATIC ANALYSIS AND SCENE CHANGING FORECASTING IN MOTION ESTIMATION

(76) Inventors: Hiroshi Akimoto, 26, Kitayacho, Nakahara-ku, Kawasaki-shi, Kanagawa-ken, 211-0015 (JP); Georgiy N. Vostrov, 23-1 Tajiricho, Nakahara-Ku, Kawasaki-shi, Kanagawa-ken (JP) 211-0015

( * ) Notice: Subject to any disclaimer, the term of this patent is extended or adjusted under 35 U.S.C. 154(b) by 788 days.

(21) Appl. No.: 10/338,983

(22) Filed: Jan. 9, 2003

(65) Prior Publication Data
US 2003/0128880 A1 Jul. 10, 2003

Related U.S. Application Data

(60) Provisional application No. 60/347,318, filed on Jan. 9, 2002.

(51) Int. Cl.
*G06K 9/36* (2006.01)
*G06K 9/46* (2006.01)

(52) U.S. Cl. ............... 382/236; 382/238; 382/239; 375/240.16

(58) Field of Classification Search ............ 382/232, 382/233, 304, 236, 238, 240, 246, 248, 250–251, 382/253, 239, 244–245; 375/240.16, 240.19
See application file for complete search history.

(56) References Cited

U.S. PATENT DOCUMENTS

| | | | |
|---|---|---|---|
| 5,802,220 A | 9/1998 | Black et al. | 382/276 |
| 5,875,108 A | 2/1999 | Hoffberg et al. | 364/146 |
| 5,995,941 A | 11/1999 | Maquire et al. | 705/10 |
| 6,023,300 A | 2/2000 | Han et al. | 348/416 |
| 6,049,619 A | 4/2000 | Anandan et al. | 382/107 |
| 6,052,414 A | 4/2000 | Lee et al. | 375/240 |
| 6,058,210 A | 5/2000 | de Queiroz et al. | 382/232 |
| 6,108,458 A | 8/2000 | Hart | 382/278 |

(Continued)

OTHER PUBLICATIONS

Jungwoo Lee, Bradley W. Dickinson, Subband Video Coding with Scene-Adaptive Hierarchial Motion Estimation, IEEE Transactions on Circuits and Systems for Video Technology, vol. 9, No. 3, Apr. 1999.

(Continued)

*Primary Examiner*—Jingge Wu
*Assistant Examiner*—Ali Bayat
(74) *Attorney, Agent, or Firm*—David L. Garrison; Garrison & Associates PS

(57) ABSTRACT

The invention teaches correlation analysis of the stochastic relationship between video images for use in motion estimation. On the basis of the method of analysis of correlation values as temporal series, a method was created for the analysis of the dynamics of the objects in the scenes, the isolation of quasi-static fragments of the images and the use of the obtained information for the construction of optimal procedures for making decisions in the control of motion estimation and the isolation of different types of motion of the objects. The dynamics of motion of objects or blocks in a video scene can be predicted, and the results of the predicting permit the isolation in motion of each element of the scene—the following components: camera motion, object motion, object distortion thereby allowing the possibility of isolating groups of blocks for which a given coding strategy has maximum effectiveness.

4 Claims, 30 Drawing Sheets

U.S. PATENT DOCUMENTS

| | | |
|---|---|---|
| 6,118,893 A | 9/2000 | Li .................................. 382/150 |
| 6,148,027 A | 11/2000 | Song et al. .................... 375/240 |
| 6,160,850 A | 12/2000 | Chen et al. ............... 375/240.16 |
| 6,173,077 B1 | 1/2001 | Trew et al. .................... 382/236 |
| 6,175,644 B1 | 1/2001 | Scola et al. ................... 381/141 |
| 6,192,145 B1 | 2/2001 | Anandan et al. .............. 382/154 |
| 6,983,018 B1* | 1/2006 | Lin et al. ................. 375/240.16 |
| 2001/0028743 A1* | 10/2001 | Kostrzewski et al. ......... 382/232 |
| 2002/0028026 A1* | 3/2002 | Chen et al. .................... 382/284 |
| 2002/0146071 A1* | 10/2002 | Liu et al. ................. 375/240.16 |
| 2002/0171759 A1* | 11/2002 | Handjojo et al. ............. 348/452 |
| 2003/0031257 A1* | 2/2003 | Yoshida et al. .......... 375/240.16 |

OTHER PUBLICATIONS

Sila Ekmekei, Encoding and Reconstruction of Incomplete 3-D Video Objects, IEEE Transactions on Circuits and Systems for Video Technology, vol. 10, No. 4, Jun. 2000.

Jin Liu, David Przewozny, Siegmund Pastoor, Layered Representation of Scenes Based on Multiview Image Analysis, IEEE Transactions on Circuits and Systems for Video Technology, vol. 10, No. 7, Oct. 2000.

* cited by examiner

The changes of scenery are happend per

The 98-th frame from «Boat» test movie

FIG.5A
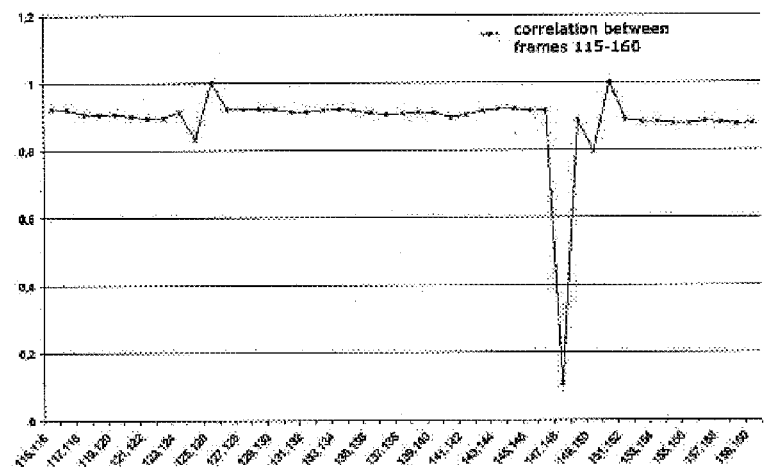
The frame 125 from test movie
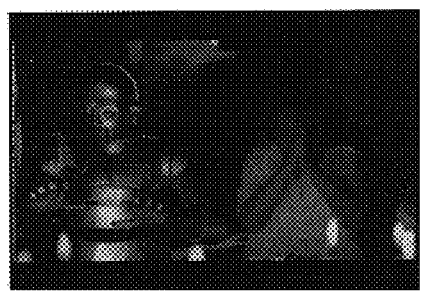
The frame 126 from test movie
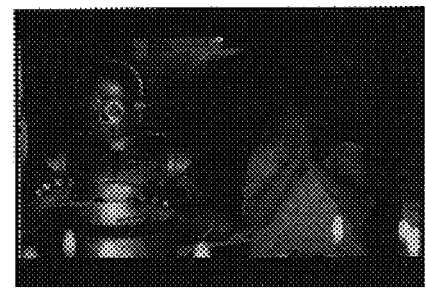
The frame 151 from test movie
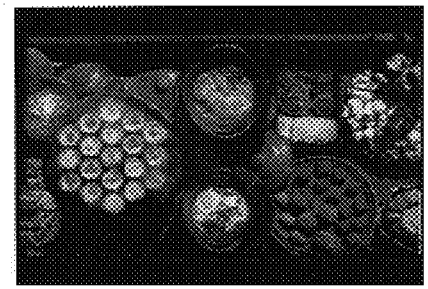
The frame 152 from test movie
FIG.5B

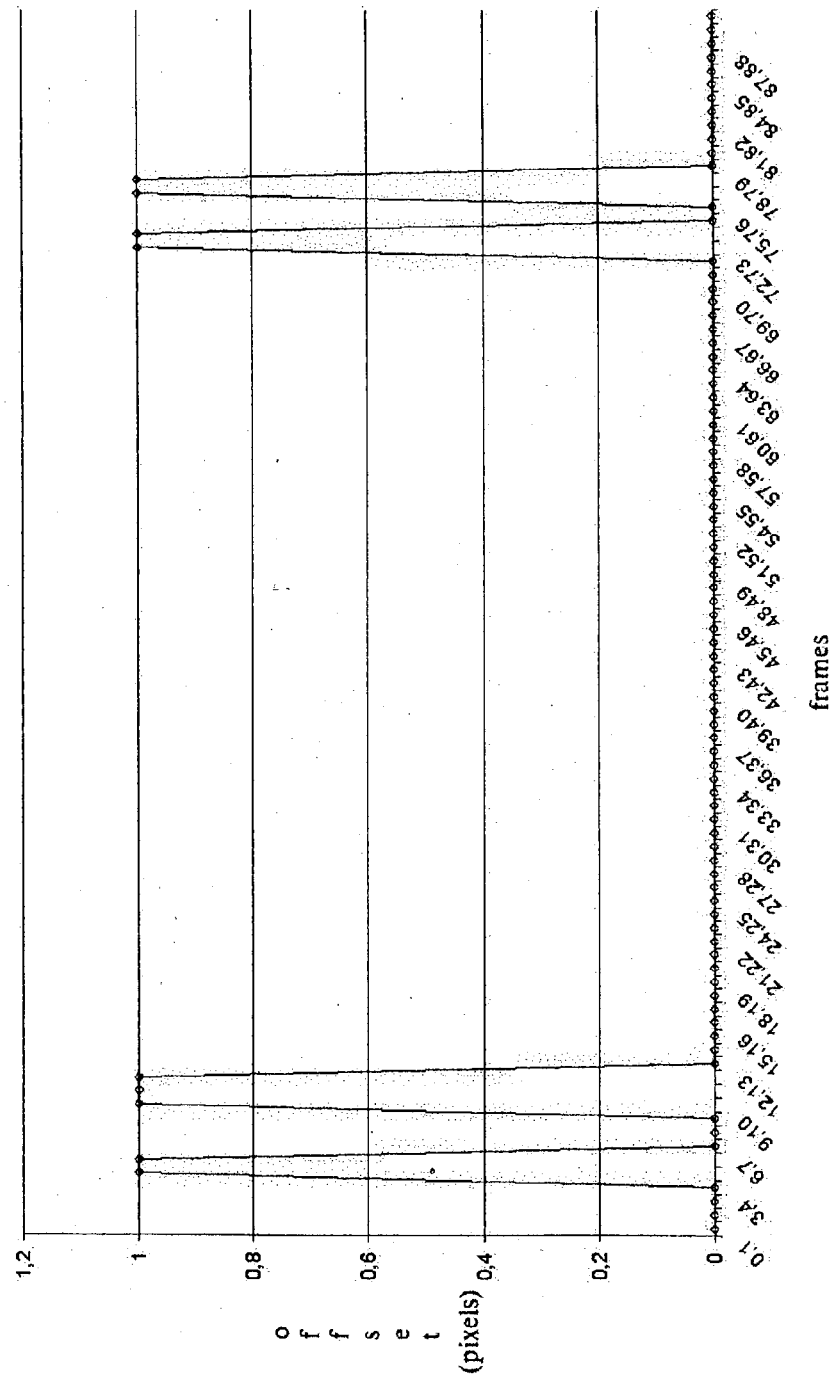
FIG.16A Boat

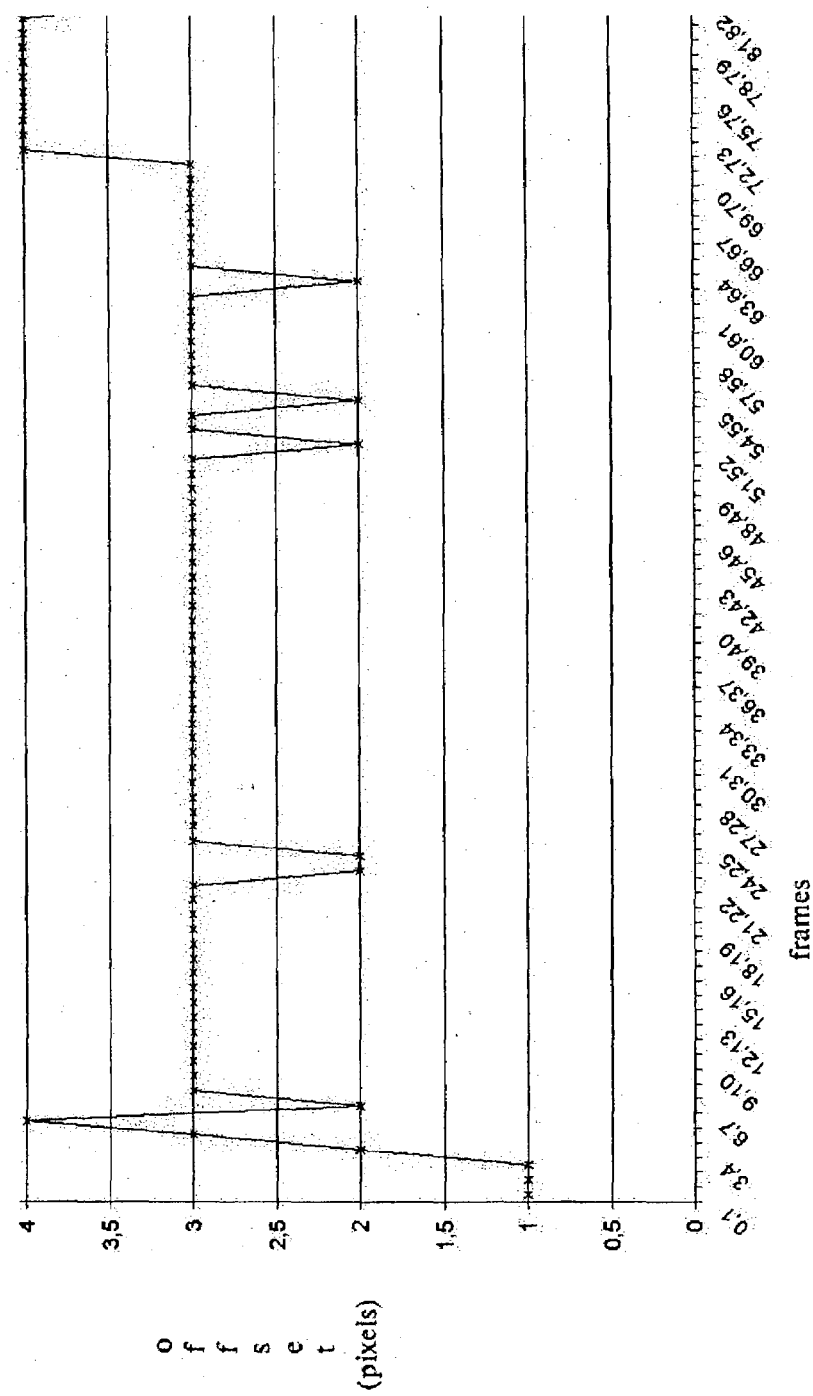
FIG.16B Seaside part

| Frames Boat | Left Offset 0 | Left Offset 1 | Left Offset 2 | Left Offset 3 | Left Offset 4 | Left Offset 5 | Max Corr of left offset |
|---|---|---|---|---|---|---|---|
| 0,1 | 1,00000 | 0,94341 | 0,85649 | 0,77812 | 0,70617 | 0,64025 | 1,00000 |
| 1,2 | 0,97569 | 0,94675 | 0,85825 | 0,78834 | 0,71588 | 0,64991 | 0,97569 |
| 2,3 | 0,97762 | 0,95069 | 0,87366 | 0,79519 | 0,72236 | 0,65658 | 0,97762 |
| 3,4 | 0,97226 | 0,94673 | 0,85900 | 0,78885 | 0,71404 | 0,64732 | 0,97226 |
| 4,5 | 0,95280 | 0,96338 | 0,85987 | 0,78885 | 0,75262 | 0,68373 | 0,96333 |
| 5,6 | 0,93967 | 0,96366 | 0,91101 | 0,82501 | 0,76552 | 0,69746 | 0,96366 |
| 6,7 | 0,97069 | 0,95891 | 0,88553 | 0,83731 | 0,73261 | 0,66695 | 0,97059 |
| 7,8 | 0,96403 | 0,95865 | 0,88982 | 0,80662 | 0,74398 | 0,67541 | 0,96403 |
| 8,9 | 0,98032 | 0,95363 | 0,88481 | 0,81691 | 0,74389 | 0,6716 | 0,98032 |
| 9,10 | 0,94955 | 0,95321 | 0,88798 | 0,81395 | 0,7471 | 0,68137 | 0,95321 |
| 10,11 | 0,95724 | 0,96264 | 0,89467 | 0,81643 | 0,75029 | 0,68286 | 0,96264 |
| 11,12 | 0,95636 | 0,96298 | 0,89570 | 0,82128 | 0,74712 | 0,67809 | 0,96298 |
| 12,13 | 0,96285 | 0,96085 | 0,89169 | 0,82053 | 0,74787 | 0,67876 | 0,96285 |
| 13,14 | 0,95364 | 0,94857 | 0,88185 | 0,81966 | 0,74361 | 0,6762 | 0,95364 |
| 14,15 | 0,95985 | 0,95967 | 0,89194 | 0,813 | 0,74939 | 0,68023 | 0,95985 |
| 15,16 | 0,96175 | 0,96167 | 0,89269 | 0,82039 | 0,74835 | 0,67826 | 0,96175 |
| 16,17 | 0,96372 | 0,96075 | 0,89055 | 0,81986 | 0,7438 | 0,6746 | 0,96372 |
| 17,18 | 0,97453 | 0,95084 | 0,87629 | 0,81634 | 0,72976 | 0,66094 | 0,97453 |
| 18,19 | 0,96999 | 0,94618 | 0,87141 | 0,80287 | 0,72859 | 0,66178 | 0,96999 |
| 19,20 | 0,97467 | 0,93785 | 0,86377 | 0,79954 | 0,71935 | 0,65178 | 0,97467 |
| 20,21 | 0,97699 | 0,93777 | 0,86427 | 0,79176 | 0,72034 | 0,654 | 0,97699 |
| 21,22 | 0,97401 | 0,92888 | 0,85924 | 0,7925 | 0,72193 | 0,65783 | 0,97401 |
| 22,23 | 0,97211 | 0,91395 | 0,84664 | 0,79138 | 0,70634 | 0,64274 | 0,97211 |
| 23,24 | 0,97317 | 0,91608 | 0,84779 | 0,77721 | 0,70892 | 0,64529 | 0,97317 |
| 24,25 | 0,97845 | 0,92486 | 0,85549 | 0,77897 | 0,7168 | 0,65314 | 0,97845 |
| 25,26 | 0,97261 | 0,91865 | 0,85170 | 0,78612 | 0,71592 | 0,65238 | 0,97251 |
| 26,27 | 0,97523 | 0,92154 | 0,85502 | 0,78468 | 0,71857 | 0,65446 | 0,97523 |
| 27,28 | 0,97861 | 0,92805 | 0,85925 | 0,78798 | 0,72297 | 0,65797 | 0,97861 |
| 28,29 | 0,98004 | 0,93147 | 0,86075 | 0,79168 | 0,72394 | 0,65849 | 0,98004 |
| 29,30 | 0,98186 | 0,93591 | 0,86447 | 0,79274 | 0,72524 | 0,65987 | 0,98186 |
| 30,31 | 0,98152 | 0,93627 | 0,86375 | 0,79487 | 0,72379 | 0,65759 | 0,98152 |
| 31,32 | 0,98158 | 0,93996 | 0,86597 | 0,7939 | 0,72394 | 0,65804 | 0,98168 |
| 32,33 | 0,97779 | 0,94252 | 0,86880 | 0,79488 | 0,72764 | 0,66182 | 0,97779 |
| 33,34 | 0,98123 | 0,92741 | 0,85779 | 0,79817 | 0,71779 | 0,65109 | 0,98123 |
| 34,35 | 0,98262 | 0,93164 | 0,86124 | 0,78937 | 0,71993 | 0,65277 | 0,98262 |
| 35,36 | 0,97787 | 0,94996 | 0,87805 | 0,7923 | 0,73847 | 0,67037 | 0,97787 |
| 36,37 | 0,98137 | 0,94885 | 0,87754 | 0,80955 | 0,7375 | 0,66997 | 0,98137 |
| 37,38 | 0,98253 | 0,93653 | 0,86442 | 0,80854 | 0,72406 | 0,6569 | 0,98253 |
| 38,39 | 0,98166 | 0,94444 | 0,87175 | 0,79519 | 0,7303 | 0,66269 | 0,98166 |
| 39,40 | 0,97921 | 0,94242 | 0,87036 | 0,80178 | 0,73045 | 0,66332 | 0,97921 |
| 40,41 | 0,97778 | 0,94190 | 0,86962 | 0,80099 | 0,73167 | 0,66416 | 0,97778 |
| 41,42 | 0,97859 | 0,93636 | 0,86430 | 0,80139 | 0,72461 | 0,6565 | 0,97859 |
| 42,43 | 0,97879 | 0,93568 | 0,86553 | 0,79515 | 0,72723 | 0,65979 | 0,97879 |
| 43,44 | 0,97685 | 0,94283 | 0,86885 | 0,79892 | 0,73018 | 0,66347 | 0,97685 |

FROM FIG.17A

| | | | | | | |
|---|---|---|---|---|---|---|
| 44,45 | 0,98042 | 0,94246 | 0,86981 | 0,80158 | 0,73318 | 0,66646 |
| 45,46 | 0,98143 | 0,93467 | 0,86324 | 0,79483 | 0,72561 | 0,65879 |
| 46,47 | 0,97898 | 0,92226 | 0,85245 | 0,78402 | 0,71343 | 0,6465 |
| 47,48 | 0,98156 | 0,93529 | 0,86329 | 0,79436 | 0,72441 | 0,65837 |
| 48,49 | 0,97680 | 0,93476 | 0,86447 | 0,79714 | 0,72837 | 0,66362 |
| 49,50 | 0,98110 | 0,93956 | 0,86618 | 0,79648 | 0,72621 | 0,65988 |
| 50,51 | 0,97215 | 0,91415 | 0,84203 | 0,77112 | 0,69982 | 0,63347 |
| 51,52 | 0,97521 | 0,91656 | 0,84523 | 0,77388 | 0,70186 | 0,63466 |
| 52,53 | 0,97956 | 0,92583 | 0,85595 | 0,78766 | 0,71719 | 0,65019 |
| 53,54 | 0,97915 | 0,92286 | 0,85279 | 0,78259 | 0,71043 | 0,64196 |
| 54,55 | 0,97305 | 0,91188 | 0,84108 | 0,76965 | 0,69735 | 0,62966 |
| 55,56 | 0,97381 | 0,91143 | 0,84163 | 0,76973 | 0,69646 | 0,62909 |
| 56,57 | 0,97919 | 0,92354 | 0,85154 | 0,78061 | 0,70915 | 0,64234 |
| 57,58 | 0,98004 | 0,92725 | 0,85484 | 0,78473 | 0,71397 | 0,64772 |
| 58,59 | 0,97904 | 0,92108 | 0,85038 | 0,78085 | 0,71012 | 0,64334 |
| 59,60 | 0,97930 | 0,92100 | 0,85013 | 0,78199 | 0,71199 | 0,64534 |
| 60,61 | 0,98158 | 0,92884 | 0,85505 | 0,78554 | 0,71491 | 0,64864 |
| 61,62 | 0,97764 | 0,91785 | 0,84477 | 0,77477 | 0,70481 | 0,63999 |
| 62,63 | 0,96938 | 0,89331 | 0,82452 | 0,75633 | 0,6857 | 0,62162 |
| 63,64 | 0,97144 | 0,90700 | 0,83659 | 0,76676 | 0,59574 | 0,62973 |
| 64,65 | 0,96787 | 0,90144 | 0,83219 | 0,76202 | 0,69153 | 0,62674 |
| 65,66 | 0,97531 | 0,91210 | 0,84040 | 0,77061 | 0,70005 | 0,63415 |
| 66,67 | 0,97725 | 0,93205 | 0,85357 | 0,78051 | 0,70865 | 0,64139 |
| 67,68 | 0,97271 | 0,92644 | 0,84855 | 0,77543 | 0,70347 | 0,63585 |
| 68,69 | 0,97437 | 0,93096 | 0,85201 | 0,77887 | 0,70758 | 0,6402 |
| 69,70 | 0,98211 | 0,93703 | 0,85751 | 0,78438 | 0,71231 | 0,64393 |
| 70,71 | 0,97308 | 0,93611 | 0,85604 | 0,78438 | 0,71113 | 0,64394 |
| 71,72 | 0,86765 | 0,96869 | 0,87938 | 0,80191 | 0,73042 | 0,66256 |
| 72,73 | 0,96354 | 0,96745 | 0,89274 | 0,81361 | 0,74235 | 0,67592 |
| 73,74 | 0,96335 | 0,96692 | 0,89157 | 0,81165 | 0,73979 | 0,67246 |
| 74,75 | 0,96895 | 0,96166 | 0,88160 | 0,80204 | 0,72916 | 0,66116 |
| 75,76 | 0,96941 | 0,96033 | 0,88141 | 0,80461 | 0,73311 | 0,66597 |
| 76,77 | 0,95559 | 0,96421 | 0,89157 | 0,81184 | 0,74027 | 0,67504 |
| 77,78 | 0,96394 | 0,96448 | 0,88923 | 0,81111 | 0,74006 | 0,67475 |
| 78,79 | 0,98022 | 0,95601 | 0,87779 | 0,79999 | 0,72788 | 0,66163 |
| 79,80 | 0,96096 | 0,95652 | 0,88104 | 0,80326 | 0,73106 | 0,66422 |
| 80,81 | 0,96165 | 0,95719 | 0,88029 | 0,80294 | 0,7311 | 0,66446 |
| 81,82 | 0,97324 | 0,94123 | 0,86308 | 0,78932 | 0,71787 | 0,65093 |
| 82,83 | 0,97923 | 0,95480 | 0,87654 | 0,80216 | 0,73084 | 0,66374 |
| 83,84 | 0,97353 | 0,95501 | 0,87998 | 0,80782 | 0,73862 | 0,67242 |
| 84,85 | 0,97830 | 0,96556 | 0,87888 | 0,8065 | 0,73598 | 0,66877 |
| 85,86 | 0,97851 | 0,96090 | 0,87502 | 0,80363 | 0,73406 | 0,66768 |
| 86,87 | 0,95930 | 0,94661 | 0,87371 | 0,80212 | 0,73427 | 0,66961 |
| 87,88 | 0,93504 | 0,93313 | 0,86604 | 0,79592 | 0,73126 | 0,67083 |
| 88,89 | 0,96392 | 0,95372 | 0,88021 | 0,80668 | 0,73815 | 0,67285 |
| 89,90 | 0,96678 | 0,96063 | 0,88542 | 0,80673 | 0,73119 | 0,66333 |

FIG.17B

| Frames Boat | Left Offset 0 | Left Offset 1 | Left Offset 2 | Left Offset 3 | Left Offset 4 | Left Offset 5 | Max Corr | Offsets |
|---|---|---|---|---|---|---|---|---|
| 0,1 | 1.00000 | 0.94341 | 0.85649 | 0.77812 | 0.70517 | 0.64025 | 1.00000 | 0 |
| 1,2 | 0.97559 | 0.94575 | 0.85825 | 0.78834 | 0.71588 | 0.64991 | 0.97559 | 0 |
| 2,3 | 0.97762 | 0.95069 | 0.87355 | 0.79519 | 0.72236 | 0.65558 | 0.97762 | 0 |
| 3,4 | 0.97228 | 0.94673 | 0.87900 | 0.79895 | 0.71404 | 0.64732 | 0.97225 | 1 |
| 4,5 | 0.95280 | 0.96338 | 0.85900 | 0.78995 | 0.75262 | 0.68373 | 0.96338 | 1 |
| 5,6 | 0.93967 | 0.96287 | 0.91101 | 0.82501 | 0.76552 | 0.69746 | 0.96368 | 1 |
| 6,7 | 0.97059 | 0.95891 | 0.88553 | 0.80662 | 0.73261 | 0.66695 | 0.97059 | 0 |
| 7,8 | 0.96403 | 0.95855 | 0.88982 | 0.81691 | 0.74398 | 0.67541 | 0.96403 | 0 |
| 8,9 | 0.96032 | 0.95363 | 0.88481 | 0.81395 | 0.74389 | 0.6775 | 0.96032 | 0 |
| 9,10 | 0.94955 | 0.95321 | 0.88798 | 0.81543 | 0.7471 | 0.68137 | 0.95321 | 1 |
| 10,11 | 0.95724 | 0.95264 | 0.89457 | 0.82128 | 0.75022 | 0.68286 | 0.95254 | 1 |
| 11,12 | 0.95536 | 0.95298 | 0.88570 | 0.82053 | 0.74712 | 0.67809 | 0.95298 | 0 |
| 12,13 | 0.95285 | 0.95085 | 0.89152 | 0.81955 | 0.74787 | 0.67875 | 0.95285 | 0 |
| 13,14 | 0.95364 | 0.94857 | 0.88185 | 0.813 | 0.74951 | 0.6762 | 0.95364 | 0 |
| 14,15 | 0.95995 | 0.95957 | 0.89194 | 0.82039 | 0.74939 | 0.69023 | 0.95995 | 0 |
| 15,16 | 0.96175 | 0.96167 | 0.89269 | 0.81985 | 0.74905 | 0.67825 | 0.96175 | 0 |
| 16,17 | 0.96372 | 0.96075 | 0.89055 | 0.81634 | 0.7493 | 0.6745 | 0.96372 | 0 |
| 17,18 | 0.97453 | 0.95064 | 0.87529 | 0.80287 | 0.72975 | 0.66094 | 0.97453 | 0 |
| 18,19 | 0.96999 | 0.94578 | 0.87141 | 0.79954 | 0.72859 | 0.66178 | 0.96999 | 0 |
| 19,20 | 0.97467 | 0.93785 | 0.86377 | 0.79487 | 0.71935 | 0.65158 | 0.97467 | 0 |
| 20,21 | 0.97899 | 0.93777 | 0.86427 | 0.7925 | 0.72034 | 0.654 | 0.97899 | 0 |
| 21,22 | 0.97401 | 0.92888 | 0.85924 | 0.79138 | 0.72193 | 0.65783 | 0.97401 | 0 |
| 22,23 | 0.97211 | 0.91396 | 0.84554 | 0.77721 | 0.70534 | 0.64274 | 0.97211 | 0 |
| 23,24 | 0.97317 | 0.91508 | 0.84779 | 0.77897 | 0.70692 | 0.64529 | 0.97317 | 0 |
| 24,25 | 0.97845 | 0.92485 | 0.85549 | 0.78612 | 0.7156 | 0.65314 | 0.97845 | 0 |
| 25,26 | 0.97251 | 0.91865 | 0.85170 | 0.78459 | 0.71592 | 0.65236 | 0.97251 | 0 |
| 26,27 | 0.97523 | 0.92154 | 0.85502 | 0.78798 | 0.71857 | 0.65446 | 0.97523 | 0 |
| 27,28 | 0.97861 | 0.92805 | 0.85925 | 0.79158 | 0.72297 | 0.65797 | 0.97861 | 0 |
| 28,29 | 0.98004 | 0.93147 | 0.86076 | 0.79274 | 0.72394 | 0.55849 | 0.98004 | 0 |
| 29,30 | 0.98186 | 0.93591 | 0.85447 | 0.79487 | 0.72524 | 0.55987 | 0.98186 | 0 |
| 30,31 | 0.98152 | 0.93627 | 0.85375 | 0.7939 | 0.72379 | 0.65759 | 0.98152 | 0 |
| 31,32 | 0.98168 | 0.93985 | 0.85597 | 0.79488 | 0.72394 | 0.65804 | 0.98153 | 0 |
| 32,33 | 0.97770 | 0.94252 | 0.85680 | 0.79817 | 0.72764 | 0.66182 | 0.97779 | 0 |
| 33,34 | 0.98123 | 0.92711 | 0.85779 | 0.79837 | 0.71779 | 0.65109 | 0.98123 | 0 |
| 34,35 | 0.98252 | 0.93164 | 0.86124 | 0.7923 | 0.71903 | 0.65277 | 0.98252 | 0 |
| 35,36 | 0.97787 | 0.94995 | 0.87805 | 0.80955 | 0.73947 | 0.67037 | 0.97787 | 0 |
| 36,37 | 0.98137 | 0.94885 | 0.87764 | 0.80854 | 0.7375 | 0.66997 | 0.98137 | 0 |
| 37,38 | 0.98263 | 0.93553 | 0.86442 | 0.79519 | 0.72406 | 0.6559 | 0.98263 | 0 |
| 38,39 | 0.98166 | 0.94444 | 0.87175 | 0.80178 | 0.7303 | 0.66269 | 0.98166 | 0 |
| 39,40 | 0.97821 | 0.94242 | 0.87036 | 0.80099 | 0.73045 | 0.66332 | 0.97821 | 0 |
| 40,41 | 0.97778 | 0.94190 | 0.86952 | 0.80139 | 0.73167 | 0.66416 | 0.97778 | 0 |
| 41,42 | 0.97859 | 0.93630 | 0.86430 | 0.79515 | 0.72481 | 0.6555 | 0.97859 | 0 |
| 42,43 | 0.97870 | 0.93558 | 0.86553 | 0.79719 | 0.72723 | 0.65979 | 0.97879 | 0 |
| 43,44 | 0.97566 | 0.94283 | 0.86885 | 0.79892 | 0.73018 | 0.66347 | 0.97566 | 0 |

| | | | | | | |
|---|---|---|---|---|---|---|
| 44.46 | 0.98042 | 0.94245 | 0.85981 | 0.80158 | 0.73318 | 0.65546 | 0.96042 | 0 |
| 45.46 | 0.98143 | 0.93467 | 0.86324 | 0.79483 | 0.72561 | 0.65879 | 0.98143 | 0 |
| 46.47 | 0.97895 | 0.92225 | 0.85245 | 0.79402 | 0.71343 | 0.6455 | 0.97895 | 0 |
| 47.48 | 0.98100 | 0.93529 | 0.85329 | 0.79435 | 0.72441 | 0.65837 | 0.98155 | 0 |
| 48.49 | 0.97890 | 0.93476 | 0.85447 | 0.79714 | 0.72637 | 0.66352 | 0.97890 | 0 |
| 49.50 | 0.98110 | 0.93955 | 0.85519 | 0.79548 | 0.72837 | 0.65988 | 0.98110 | 0 |
| 50.51 | 0.97215 | 0.91415 | 0.84203 | 0.79112 | 0.72521 | 0.63347 | 0.97215 | 0 |
| 51.52 | 0.97621 | 0.91656 | 0.84522 | 0.77398 | 0.69982 | 0.63466 | 0.97621 | 0 |
| 52.53 | 0.97958 | 0.92583 | 0.85595 | 0.77398 | 0.70185 | 0.65019 | 0.97966 | 0 |
| 53.54 | 0.97915 | 0.92286 | 0.85279 | 0.78756 | 0.71719 | 0.64195 | 0.97915 | 0 |
| 54.55 | 0.97305 | 0.91186 | 0.84163 | 0.78259 | 0.71043 | 0.62966 | 0.97305 | 0 |
| 55.56 | 0.97361 | 0.91143 | 0.84153 | 0.75973 | 0.69735 | 0.62909 | 0.97361 | 0 |
| 56.57 | 0.97919 | 0.92354 | 0.85154 | 0.78061 | 0.69846 | 0.64234 | 0.97919 | 0 |
| 57.58 | 0.98004 | 0.92725 | 0.85464 | 0.78473 | 0.70915 | 0.64772 | 0.98004 | 0 |
| 58.59 | 0.97904 | 0.92196 | 0.85038 | 0.78098 | 0.71397 | 0.64334 | 0.97904 | 0 |
| 59.60 | 0.97930 | 0.92100 | 0.85013 | 0.78199 | 0.71012 | 0.54634 | 0.97950 | 0 |
| 60.61 | 0.98158 | 0.92884 | 0.85505 | 0.79199 | 0.71491 | 0.54884 | 0.98158 | 0 |
| 61.62 | 0.97754 | 0.91785 | 0.84477 | 0.77477 | 0.70491 | 0.63999 | 0.97754 | 0 |
| 62.63 | 0.95938 | 0.89331 | 0.82462 | 0.75533 | 0.6857 | 0.62152 | 0.95926 | 0 |
| 63.64 | 0.97144 | 0.90700 | 0.83059 | 0.75676 | 0.69574 | 0.62973 | 0.97144 | 0 |
| 64.65 | 0.95767 | 0.90144 | 0.83069 | 0.75202 | 0.69153 | 0.62674 | 0.96767 | 0 |
| 65.66 | 0.97531 | 0.91210 | 0.84040 | 0.77061 | 0.70005 | 0.63415 | 0.97531 | 0 |
| 66.67 | 0.97726 | 0.93205 | 0.85357 | 0.78051 | 0.70855 | 0.64139 | 0.97726 | 0 |
| 67.68 | 0.97271 | 0.92544 | 0.84955 | 0.77543 | 0.70347 | 0.63585 | 0.97271 | 0 |
| 68.69 | 0.97437 | 0.93095 | 0.85201 | 0.77897 | 0.70755 | 0.5402 | 0.97437 | 0 |
| 69.70 | 0.98211 | 0.93703 | 0.85751 | 0.78438 | 0.71231 | 0.64393 | 0.98211 | 1 |
| 70.71 | 0.97308 | 0.93611 | 0.85600 | 0.7823 | 0.71113 | 0.64394 | 0.97308 | 0 |
| 71.72 | 0.96755 | 0.95859 | 0.87936 | 0.80191 | 0.73042 | 0.66255 | 0.98755 | 0 |
| 72.73 | 0.95354 | 0.95745 | 0.89274 | 0.81361 | 0.74235 | 0.67592 | 0.90745 | 1 |
| 73.74 | 0.95235 | 0.95682 | 0.88104 | 0.81185 | 0.73106 | 0.66422 | 0.99008 | 0 |
| 74.75 | 0.95105 | 0.95719 | 0.88029 | 0.80294 | 0.7311 | 0.65446 | 0.96105 | 0 |
| 75.76 | 0.97324 | 0.94123 | 0.86306 | 0.78922 | 0.71797 | 0.55093 | 0.97324 | 0 |
| 76.77 | 0.97523 | 0.95460 | 0.87654 | 0.80215 | 0.73064 | 0.65374 | 0.97523 | 0 |
| 77.78 | 0.97363 | 0.95501 | 0.87998 | 0.80782 | 0.73852 | 0.57242 | 0.97363 | 0 |
| 78.79 | 0.97630 | 0.95555 | 0.87502 | 0.80363 | 0.73598 | 0.55877 | 0.97630 | 0 |
| 79.80 | 0.97861 | 0.95090 | 0.87371 | 0.80212 | 0.73405 | 0.65768 | 0.97861 | 0 |
| 80.81 | 0.95830 | 0.94551 | 0.85604 | 0.79592 | 0.73427 | 0.65951 | 0.96830 | 0 |
| 81.82 | 0.95504 | 0.93313 | 0.86021 | 0.80668 | 0.73126 | 0.57083 | 0.95504 | 0 |
| 82.83 | 0.96392 | 0.95372 | 0.88021 | 0.79815 | 0.73815 | 0.57286 | 0.96392 | 0 |
| 83.84 | 0.96678 | 0.95063 | 0.88542 | 0.80573 | 0.73119 | 0.55333 | 0.96678 | 0 |

FROM FIG.18A

FIG.18B

VIDEO SEQUENCES CORRELATION AND STATIC ANALYSIS AND SCENE CHANGING FORECASTING IN MOTION ESTIMATION

CROSS-REFERENCE TO RELATED APPLICATION(S)

This application claims priority from U.S. Provisional Patent Application No. 60/347,318, entitled "Video Sequences Correlation and Static Analysis and Scene Changing Forecasting in Motion Estimation," filed Jan. 9, 2002.

FIELD OF INVENTION

The current invention relates to the field of video compression. In particular, the invention presents an aggregate of instruments, for processing a video sequence, that are directed to the deepened correlation and statistical analysis of inter-frame interaction, in separate scenes as well as in a film as a whole. The results of stochastic analysis are used in the creation of more complete methods of motion estimation.

BACKGROUND OF THE INVENTION

Video films are an effective means for describing information about a variety of subject realms and a variety of objects within those subject realms. Information about the subject realm is accumulated in databases. At the present time a great multitude of types of databases have been developed that are oriented to the applications of special methods of analysis and information processing. The result of the application of such methods is new information and knowledge about the governing laws of interaction of objects between each other and with the environment and the dynamic of change of their characteristics. The interaction of objects of the subject realm and the dynamic of change of their characteristics permits one to describe the laws of change of the subject realm, which, as a rule, a priori are not known to the observer of the subject realm.

Any video film (video sequence of images) may be looked at as a specifically organized data bank about the subject realm, possessing a specific structure, methods of access and means of analysis and processing of data.

For the most part in such banks of data the analysis and processing of information has a visual character, but at the same time the viewer receives new information and knowledge. The examined class of data is most often generated by means of video mapping of the real subject realm, and thereafter is transferred by channels of connection to multiple consumers, in the capacity of which any person may serve. Regardless of the orientation of video films to the viewer's perspective, there exists a complex problem of analysis and processing of such data during their transfer by connection channels with a series of additional limitations.

The insufficient carrying capacity of the connection channels is responsible for the impossibility of creating a system of compressing video to a high degree with the subsequent decompression after the transmission of the compressed video to the viewer. All known methods of compression consist of two components: the first is connected to the compression of static images, and the second to the compression of a dynamic sequence of video frames. In the first case the structural properties of the image are taken into consideration, while in the second the dependence between successive frames of a video film, determined by inter-frame interaction, is taken into consideration. When video scenes are compressed using techniques based on the theory of wavelet-transformation with the reference-point approach during the compression of static images, the obtained degree of compression is generally insufficient to attain the required degree of compression of a video sequence.

The images of the video sequence in the majority of cases have a stochastic nature. Each image may be represented in the form of two components, one of which has a stochastic, and the other a determinate, character. The correlation dependence between frames, as a rule, is quite significant. If the inter-frame interaction and the presentation of the video as a sequence of scenes that make up a specific subject are calculated correctly, then it succeeds even more on the basis of the calculation of the inter-frame interaction than on the order to increase the degree of compression of the video sequence. The quality of compression of the video to a significant degree depends on the completeness of information about the inter-frame interaction. In a sequence of frames the inter-frame interaction becomes clear not only in the time transfer of information between any successive frames, belonging to one scenario, but also to the transfer of information between any pair of frames from one subject. It should be noted that the time transfer of information does not bear a unique character in the entire realm of each image.

The inter-frame interaction is implemented by means of the transfer of a part of the static component and a part of the dynamic component. In the transition from one image to another a part of the information is lost as a result of the dynamic changes of the objects (distortion, change in position). The remaining part of the image remains unchanged and is transferred from one image to the other in the process of the successive change of frames.

The transferred part of the information is described by complex governing laws. The study and description of such governing laws presents a complex problem. It is possible to isolate the following approaches to its solution:

1. The statistical and correlation analysis of the structure and dynamic of the video sequence;
2. The combinatorial-statistical analysis of the block mechanism for the transfer of information;
3. The analysis of time series of displacement and brightness of groups of pixels, blocks, objects.

The necessity of use of these methods is conditioned by the fact that the results of the analysis may, in a series of events, substantially increase the quality of compression of a video sequence of images, and improve the control of bit rate.

SUMMARY OF THE INVENTION

It is possible to confirm that any image of a video sequence contains a stochastic component, which has a significant influence on the dynamic of the behavior of objects, blocks, any subset of pixels, examined as a whole, on the processes of distortion of objects and subjects of a scenario. If we look at a video as a bank of data on some subject realm, then it must reflect information on its determinate as well as its stochastic components and their characteristics. The former are determined by the fact that they are formed by determinate objects, the movement of which is determined by the camera displacement, or by their own determinate movement.

The movement of all objects in the video may break down into several components such as the following:

the movement determined by camera movement;

the movement in the subject realm relative to other objects (static and dynamic);

the distortion of an object under the influence of internal and external factors (the swaying of a tree under the influence of the wind, etc.).

If one uses a frame from the video film "The Boat," (shown in FIG. 1) as an example, the harbor structures, ships, and boats with fishermen are determinate components, while the sea in the foreground comprises a stochastic component.

In the task of motion estimation the quality of the compression of the video depends on the degree of precision of the calculation of each type of movement and the character of its randomness. As a whole a sufficiently complete calculation of all movements constitutes a complicated mathematical problem. The current invention teaches a method for the calculation of several types of movement and the use of this method for the improvement of the quality of motion estimation. Therefore, the objective of the current invention is to provide solutions for the following classes of tasks:

the detection of duplicate frames;
the isolation of moments of scene change and periods of time during which change takes place;
the presence of blocks of pixels with one law for the distribution of brightness;
the prediction of the occurrence of groups of blocks that require re-coding;
the prediction of blocks that require the application of quadratic splitting methods;
the isolation of sub-sets of groups of pixels possessing similar trajectories of movement and reflecting the dynamic of the processes of distortion of objects.
the determination of the directions and velocities of movement of the scene objects.

During the course of an entire video film a series of operations in the motion estimation method must repeat many times (the search for optimal distortions of blocks, the control of the threshold, the removal of artifacts, the construction of splitting of blocks). Each repeated execution of any of these operations requires a significant number of computations. If as a result of the analysis of the video one can precisely predict the occurrence of the noted operations, then this permits one to construct more effective methods for synthesis of motion estimation, to decrease the amount of calculations, to more effectively use the developed motion estimation technology.

The effectiveness of the resolution of the problem of global control by inter-frame interaction depends to a significant degree on the presence of complete information about the moments of scenario change, the transfer of information from the image to the subsequent image.

BRIEF DESCRIPTION OF THE DRAWINGS

FIG. 5A shows a graph containing information about the duplication of frames.

FIG. 5B shows a number of frames in the video film "The Robot."

FIGS. 16A, 16B and 16C show graphs depicting isolated hyperblocks, from the video film "The Boat," that correspond to objects such as a bridge and a boat.

FIGS. 17A and 17B show a table of values for the correlation coefficients corresponding to different displacements of the hyperblocks.

FIGS. 18A and 18B show a table of values for the correlation coefficients corresponding to different displacements of the hyperblocks.

BEST MODE OF CARRYING OUT THE INVENTION

Figure 1:
FIG. 1 shows a still representation of a frame from a video film entitled "The Boat."

The invention will now be described in preferred embodiments by reference to the drawing figures where appropriate.

As a rule, the arrangement of reference frames is used with a constant distance between them. Because of this situations are possible where a scenario change will take place between reference frames. If this is the case, the approximation of transition frames between scenarios may significantly decrease the quality of motion estimation.

Figure 2:
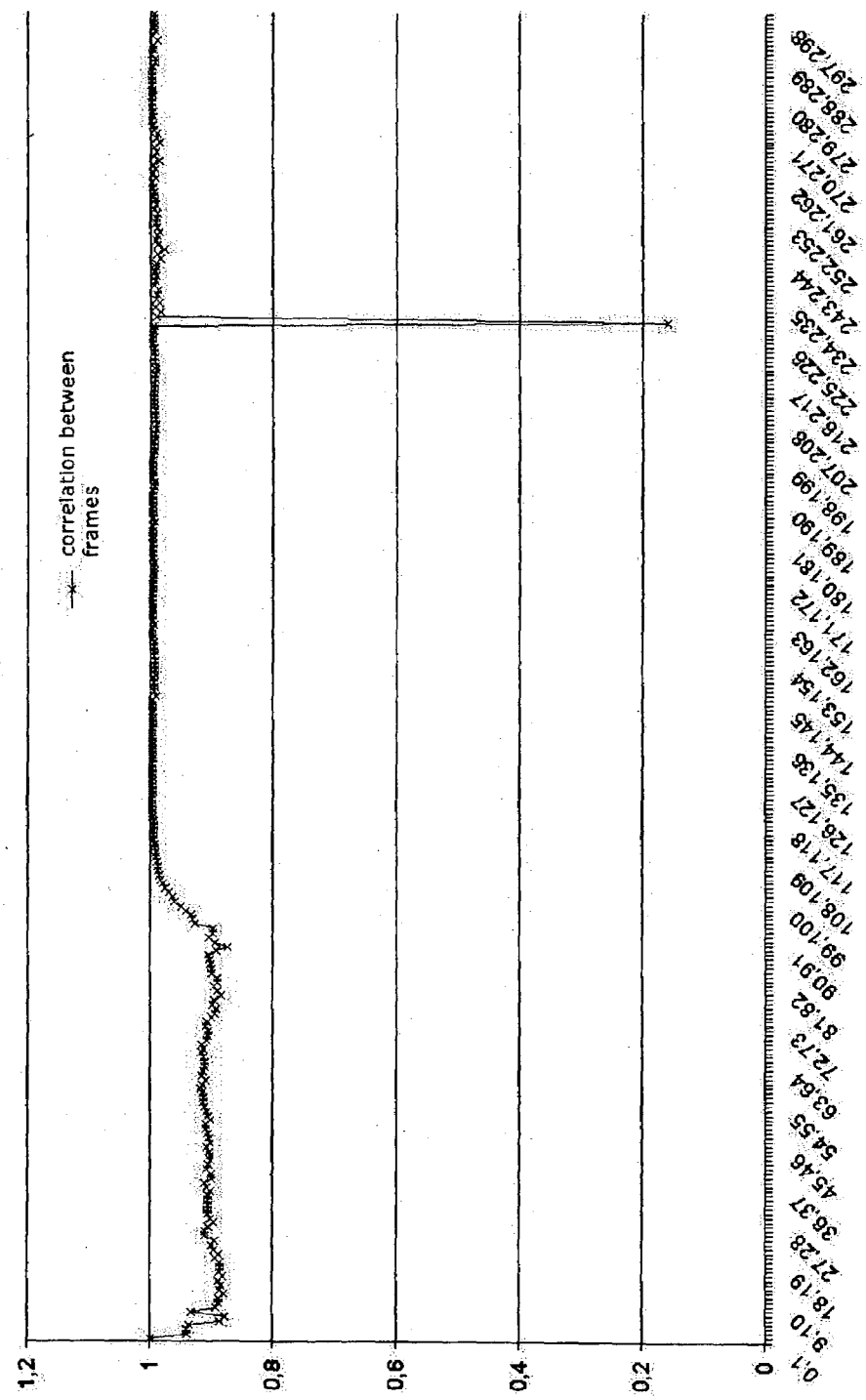
FIG. 2 shows a graph of the correlation dependence for frames of the film "The Boat."

To avoid the decrease, it is necessary to arrange the reference frames in such a way that the transition frames are used as reference frames. Such a strategy leads to an improvement in quality. This is especially important when the transition to another scenario takes place over several frames. If one looks at a time series of correlation coefficients between successive frames, then the dynamic of its change permits the removal of moments of subject change. In FIG. 2, a graph of the correlation dependence for frames of the film "The Boat" is shown. For the duration of 90–118 frames a gradual change of subject takes place.

Between frames 235 and 236, subject 2 is replaced by subject 3. A sharp change of subject leads to the fact that the correlation coefficient between these frames is close to zero. The third subject includes only the essentially determinate component, therefore the correlation coefficient is close to 1.

Figure 3A:
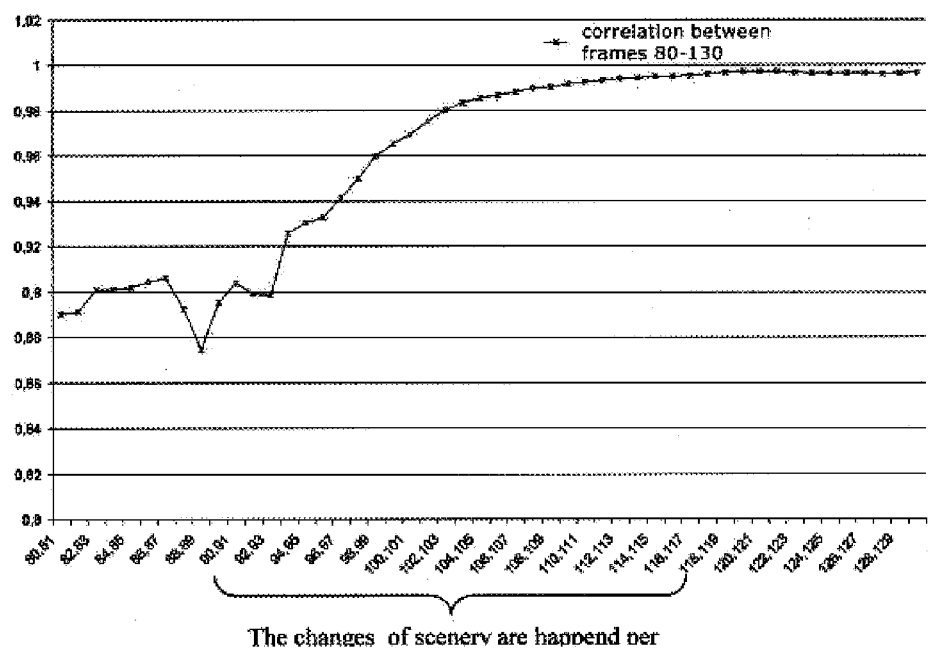
FIG. 3A is a graph showing the change of subject in more detail.
Figure 3B:
FIG. 3B shows a still representation of the 98$^{th}$ frame from the film "The Boat," demonstrating the overlap of two scenarios in a video film.

FIG. 3A is a graph showing the change of subject in more detail. Frame 98 in FIG. 3B demonstrates the overlap of two scenarios. During the second scenario the correlation coefficient between frames is close to 1, which corresponds to the dynamic of the second subject, in which each frame contains a determinate component, passing from frame to frame with insignificant changes. For all frames of the second subject, the stochastic component is insignificant and is connected with the moving resting components.

Figure 4:
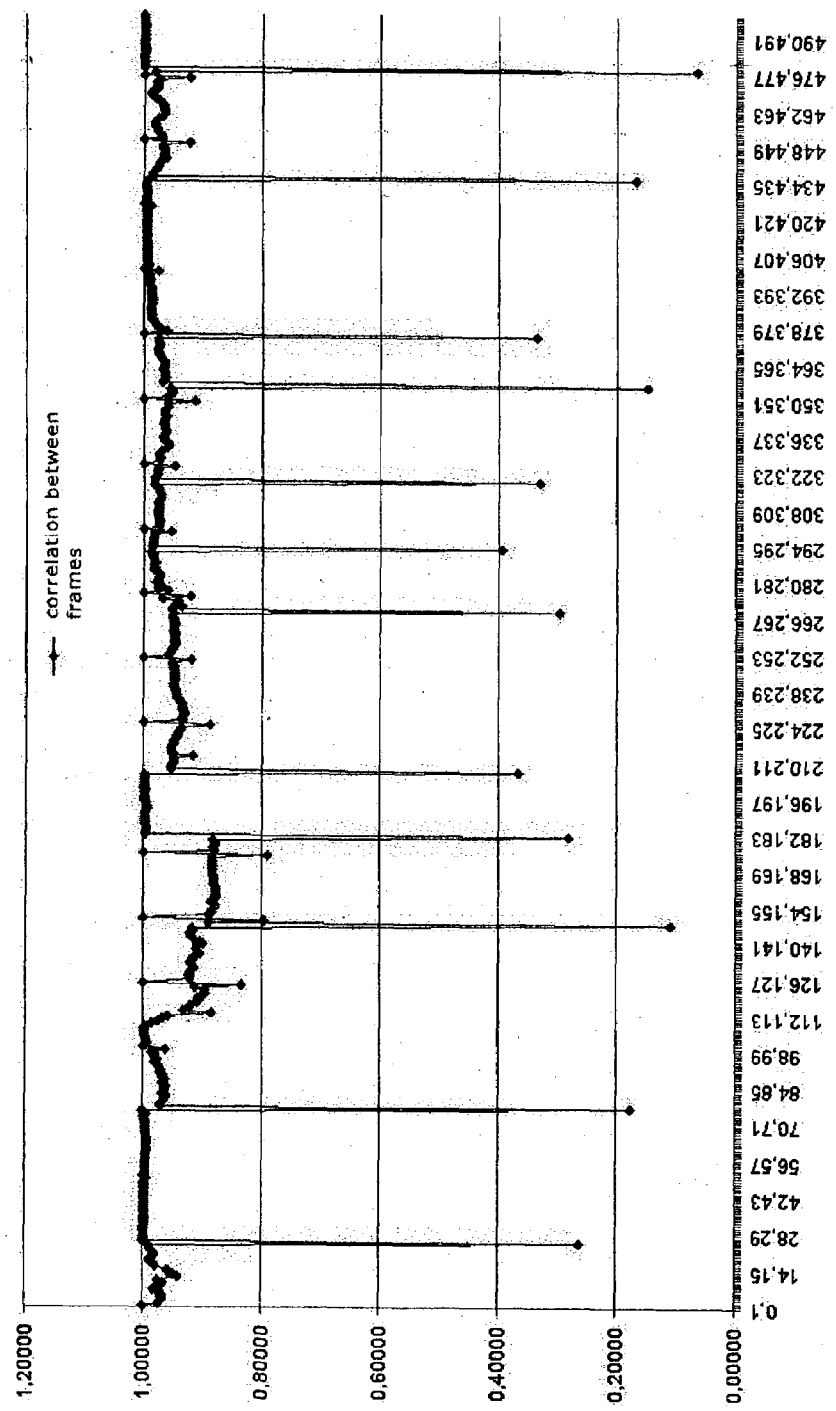
FIG. 4 shows a graph of the correlation coefficients between successive frames of the video film "The Robot" and four test frames from that film.

In FIG. 4, a graph of the correlation coefficients between successive frames of the video film "The Robot" is shown. In it, the change of subject in one frame is clearly visible. The graph unexpectedly enabled the observation that the video sequence contains identical frames. If one has similar information when coding, then on the basis thereof it is possible to significantly improve the coding quality. In FIGS. 5A and 5B, information about the duplication of frames and examples of such frames are shown.

Figure 6:
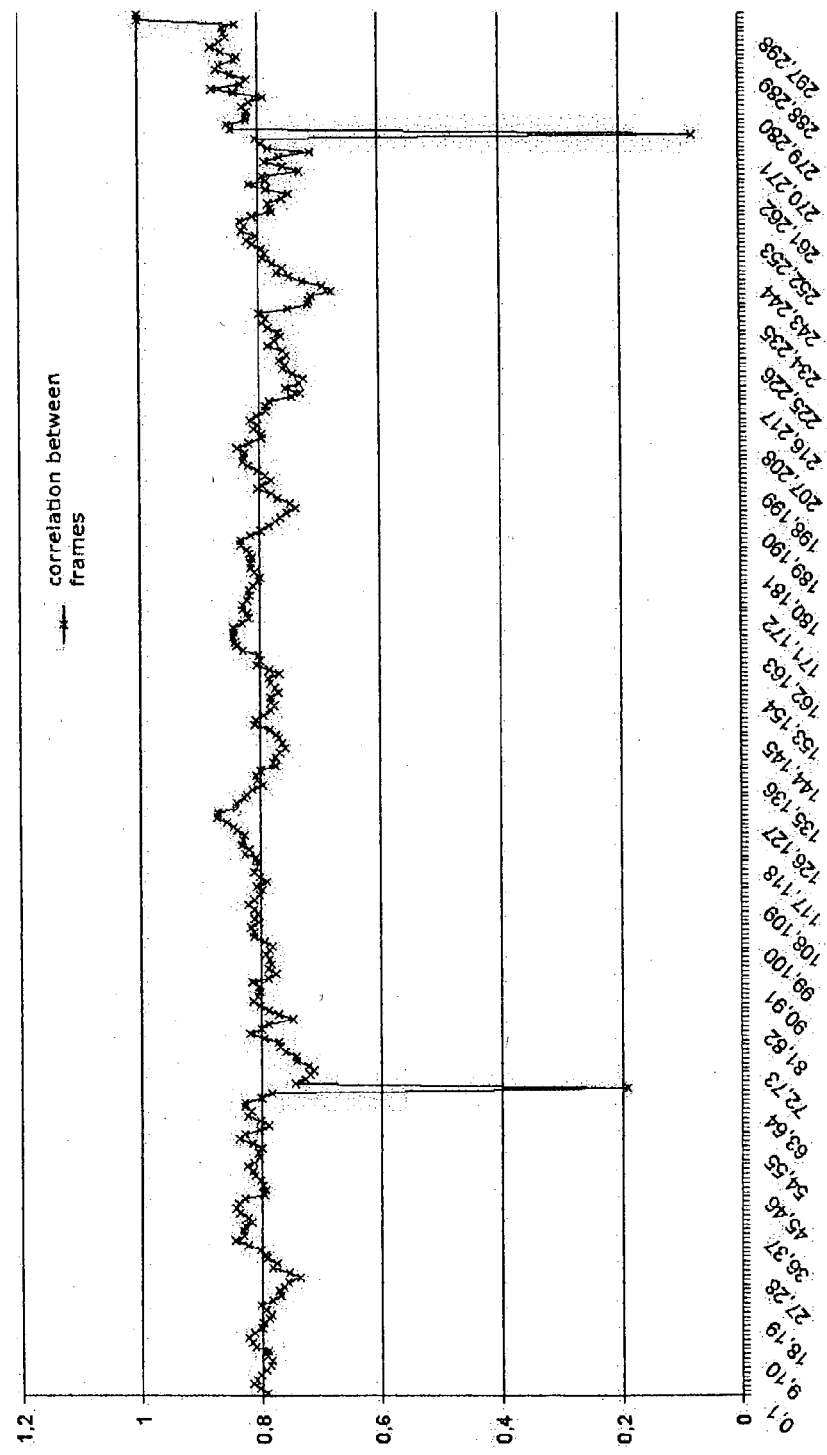
FIG. 6 shows a graph of a sample correlation coefficient between successive images for the very dynamic and complex video film "Carnival."
Figure 7:
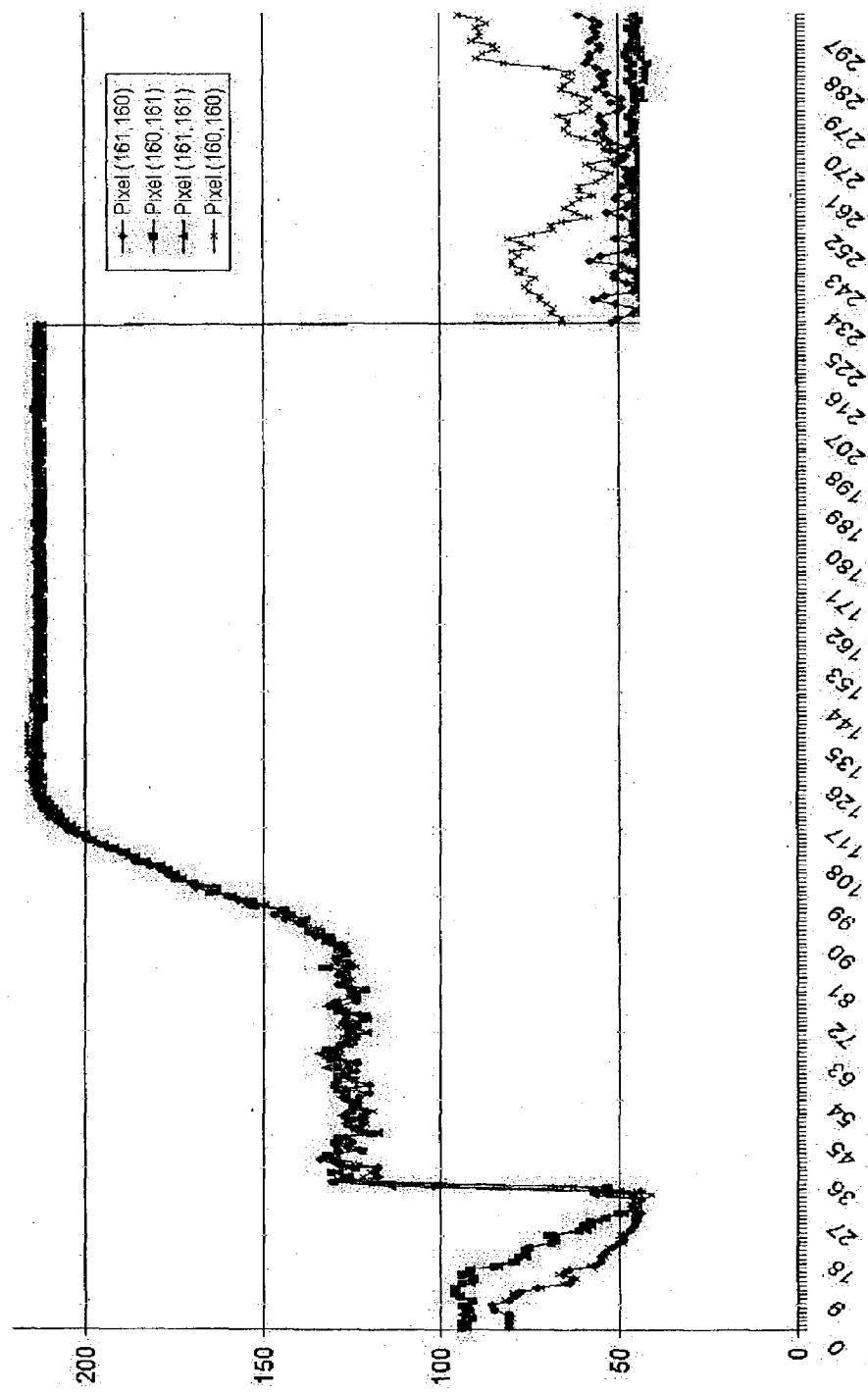
FIG. 7 shows a graph depicting the movement of four-jointed neighbor pixels in a scene of the test film "The Boat."
Figure 8A:
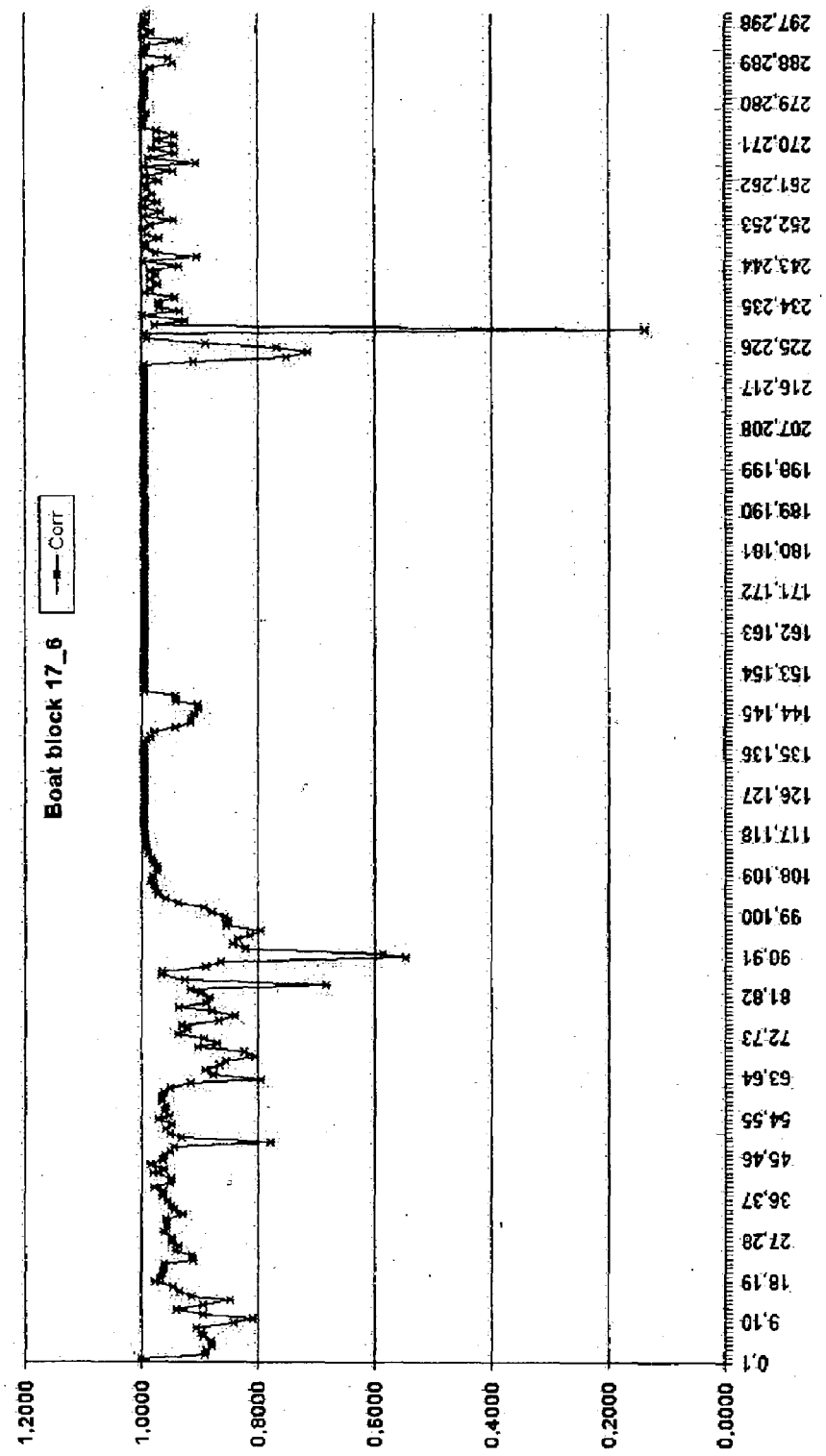
FIG. 8A shows a graph depicting the correlation coefficient for the detached block 17-6 of a frame from a scene in the test movie "The Boat."
Figure 8B:
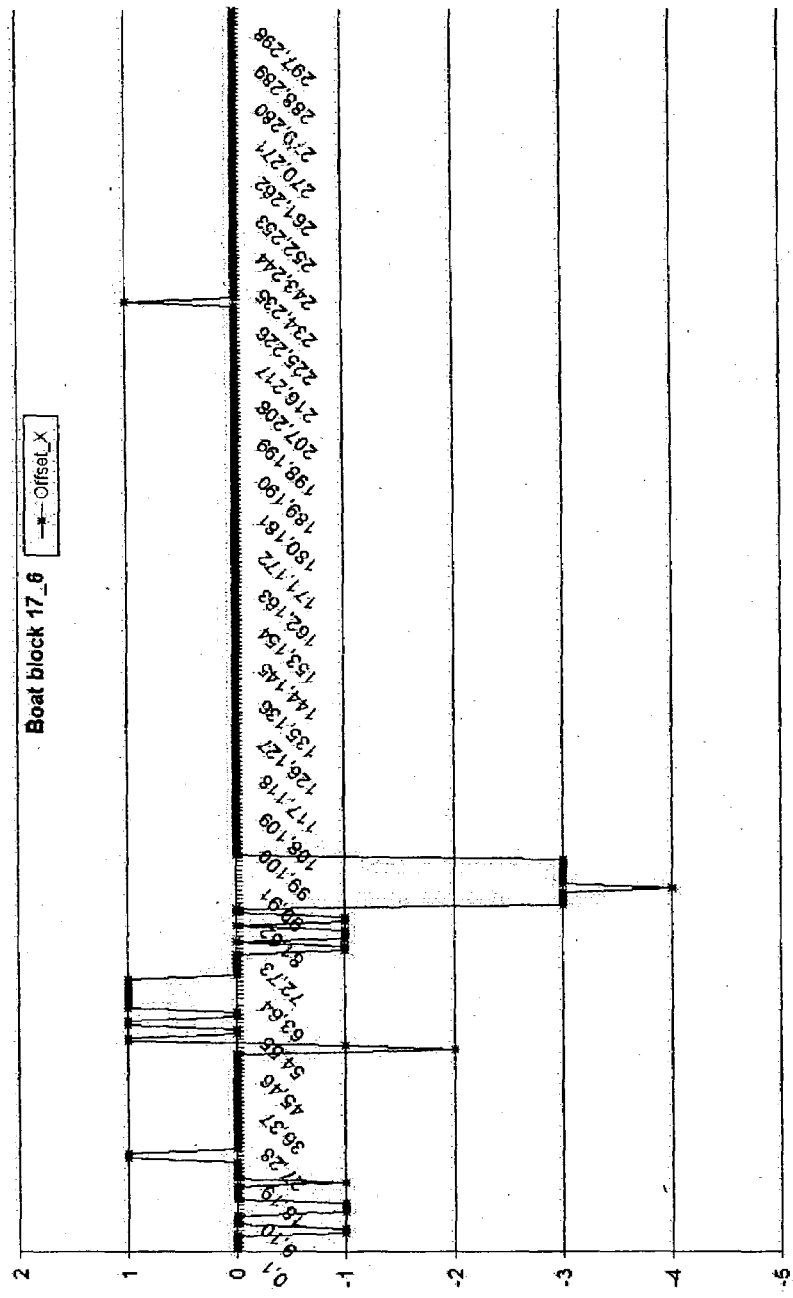
FIG. 8B shows a graph depicting the X offset for the detached block 17-6 of a frame from a scene in the test movie "The Boat."
Figure 8C:
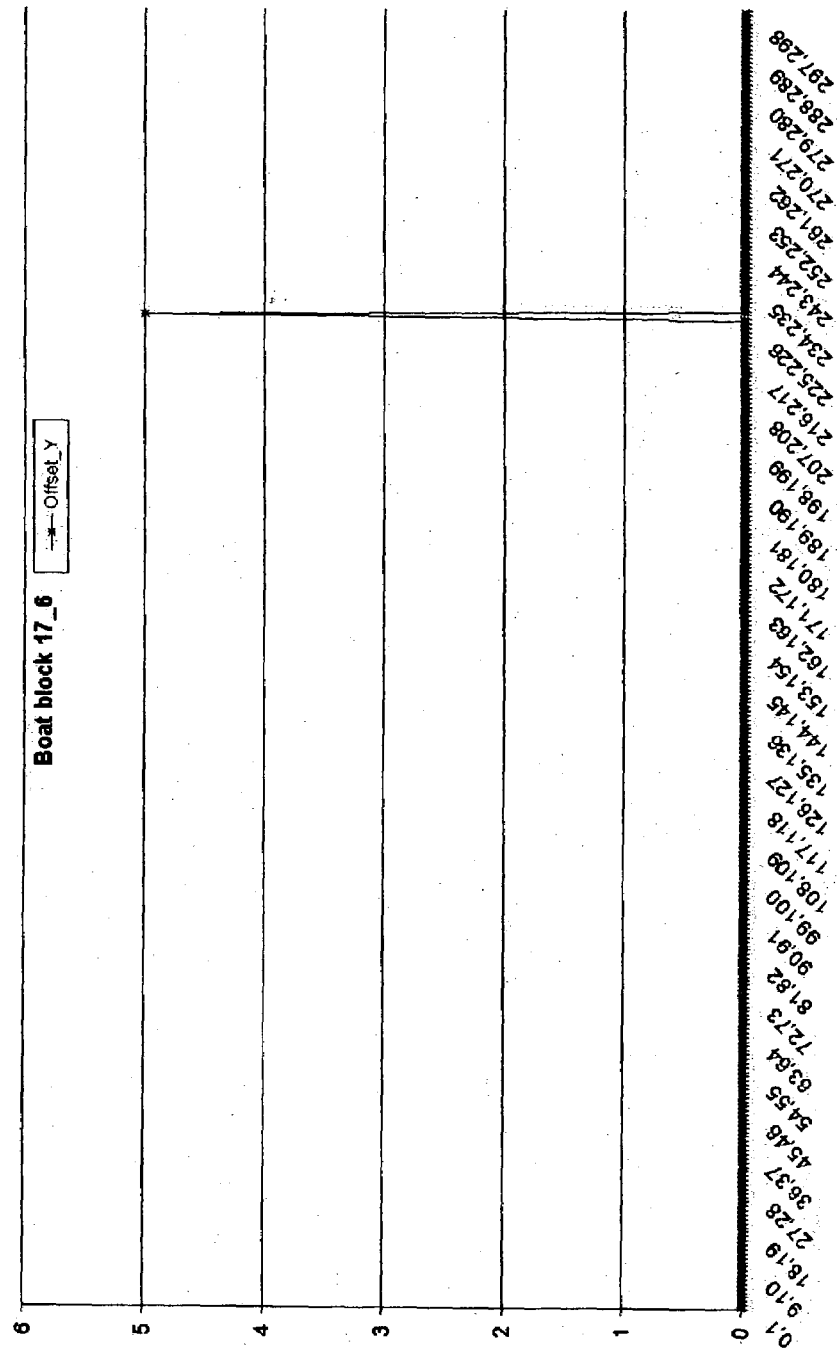
FIG. 8C shows a graph depicting the Y offset for the detached block 17-6 of a frame from a scene in the test movie "The Boat."
Figure 9A:
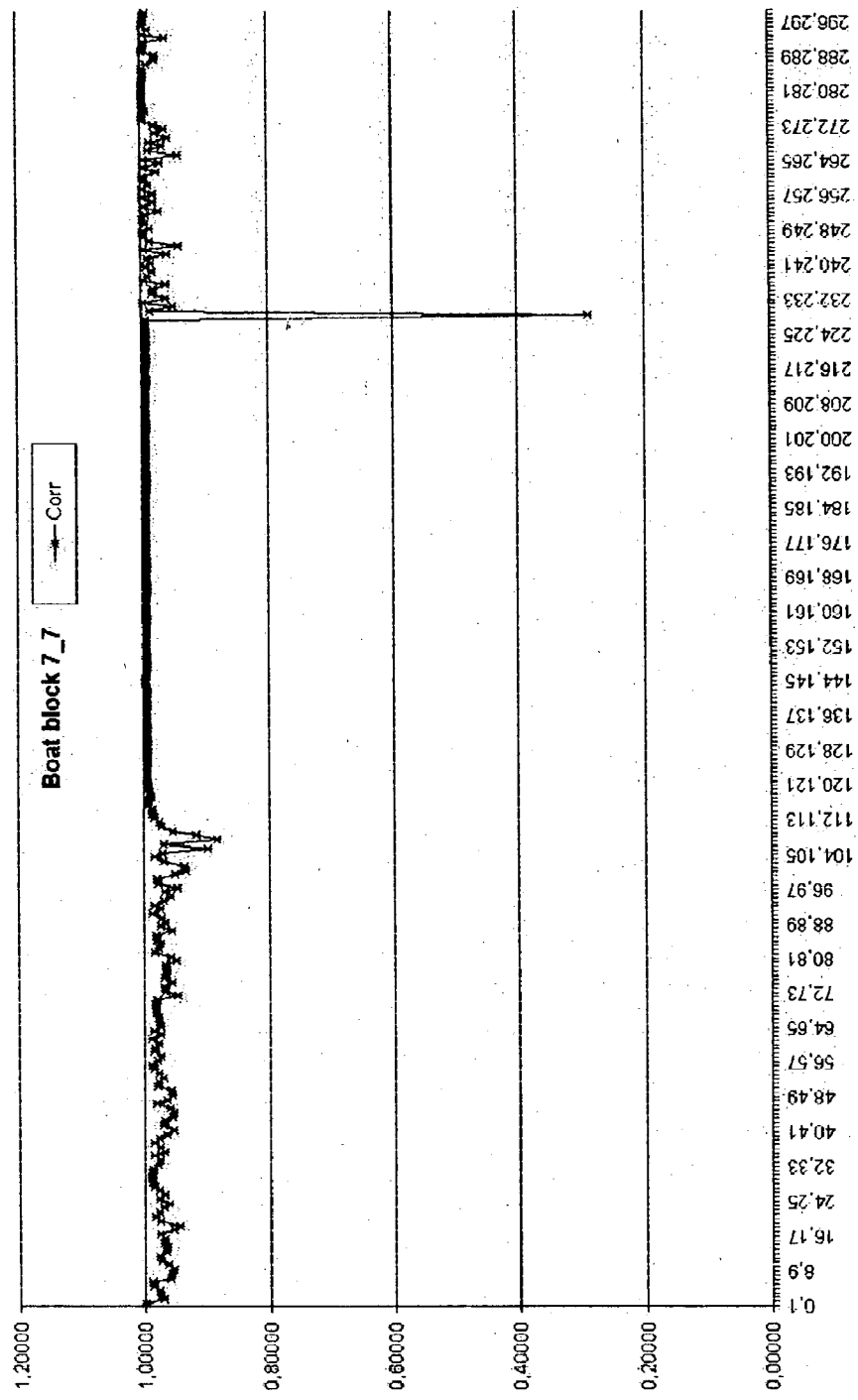
FIG. 9A shows a graph depicting the correlation coefficient for the detached block 7-7 of a frame from a scene in the test movie "The Boat."
Figure 9B:
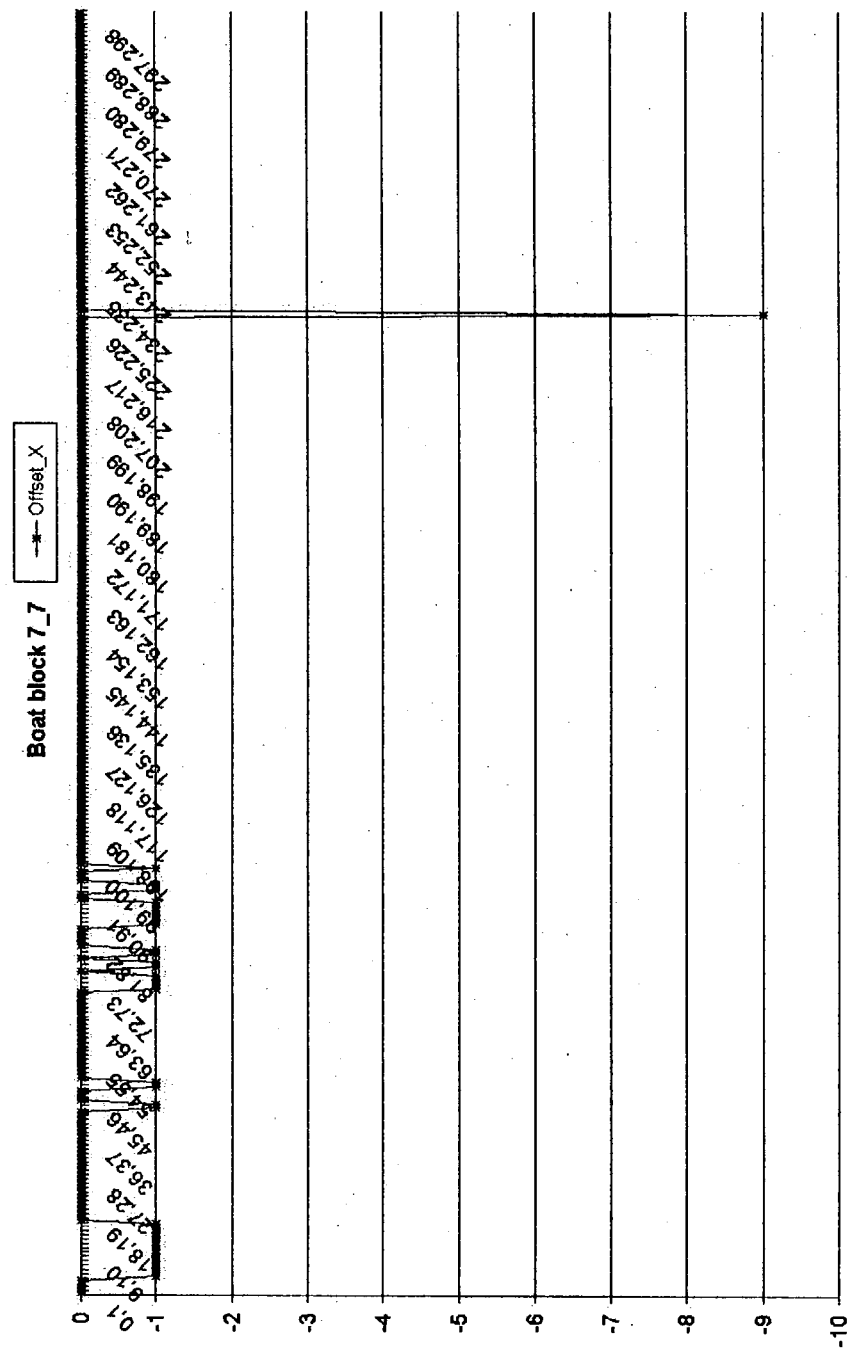
FIG. 9B shows a graph depicting the X offset for the detached block 7-7 of a frame from a scene in the test movie "The Boat."
Figure 9C:
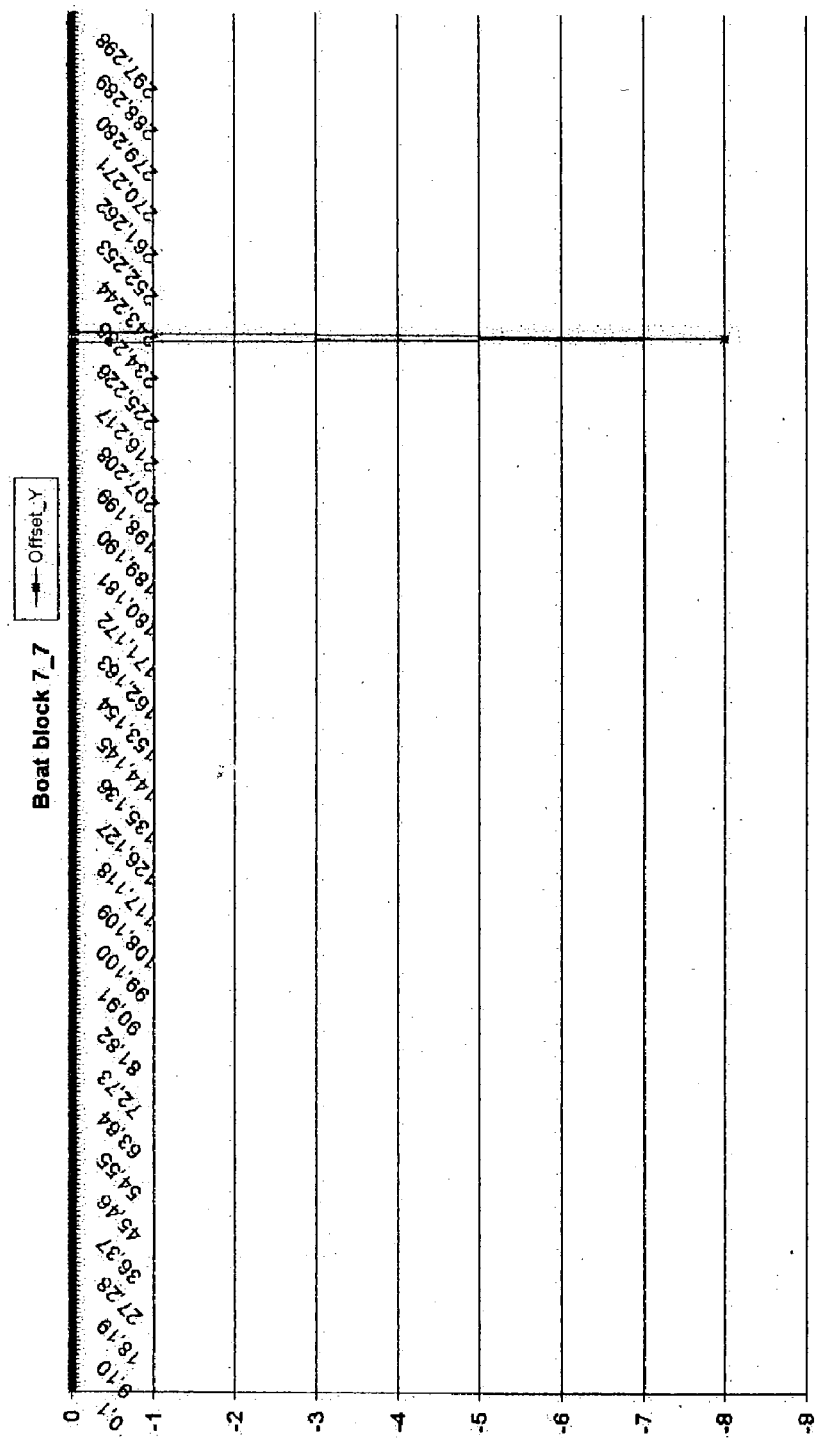
FIG. 9C shows a graph depicting the Y offset for the detached block 7-7 of a frame from a scene in the test movie "The Boat."
Figure 10A:
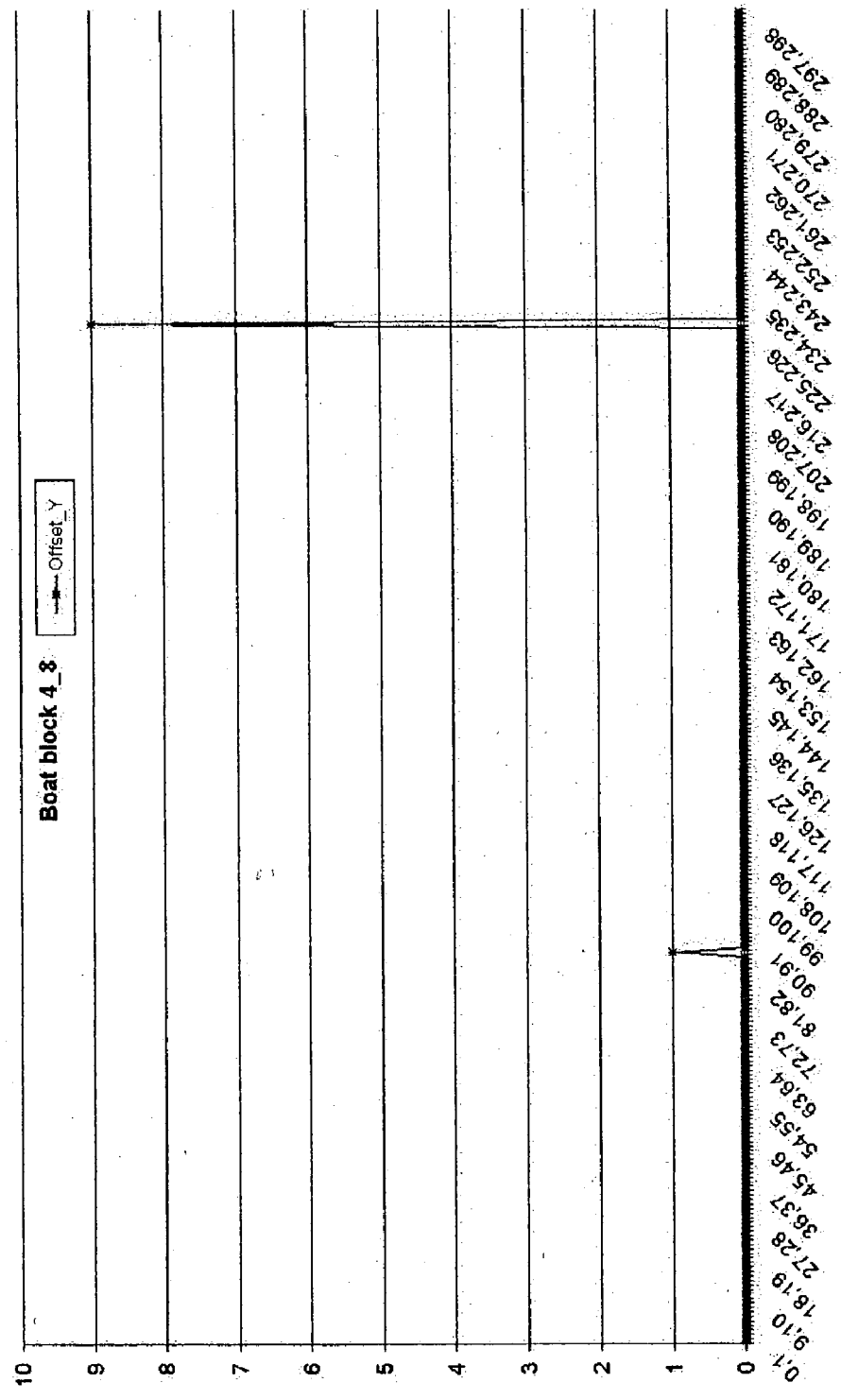
FIG. 10A shows a graph depicting the Y offset for the detached block 4-8 of a frame from a scene in the test movie "The Boat."
Figure 10B:
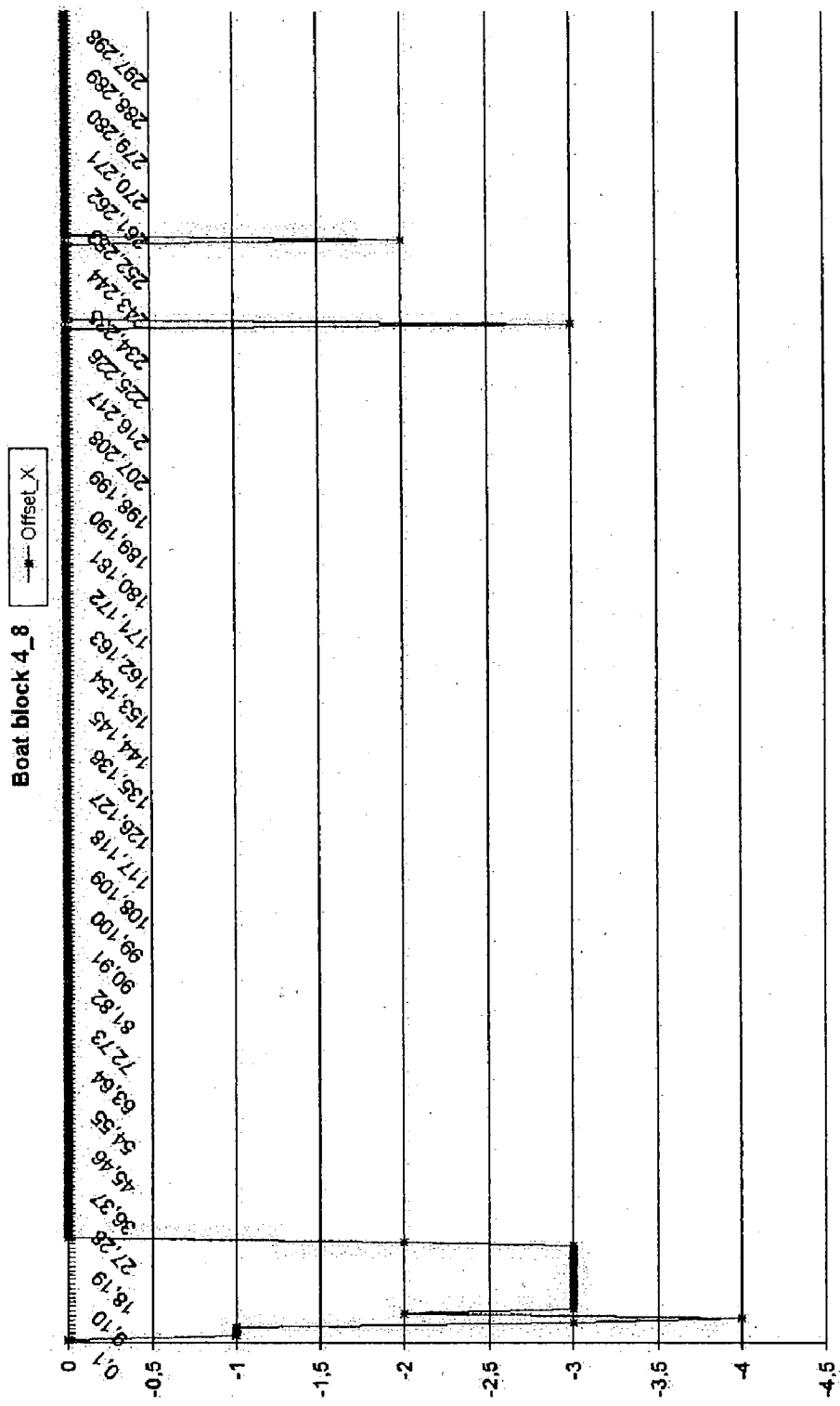
FIG. 10B shows graphs depicting the X offset for the detached block 4-8 of a frame from a scene in the test movie "The Boat."
Figure 10C:
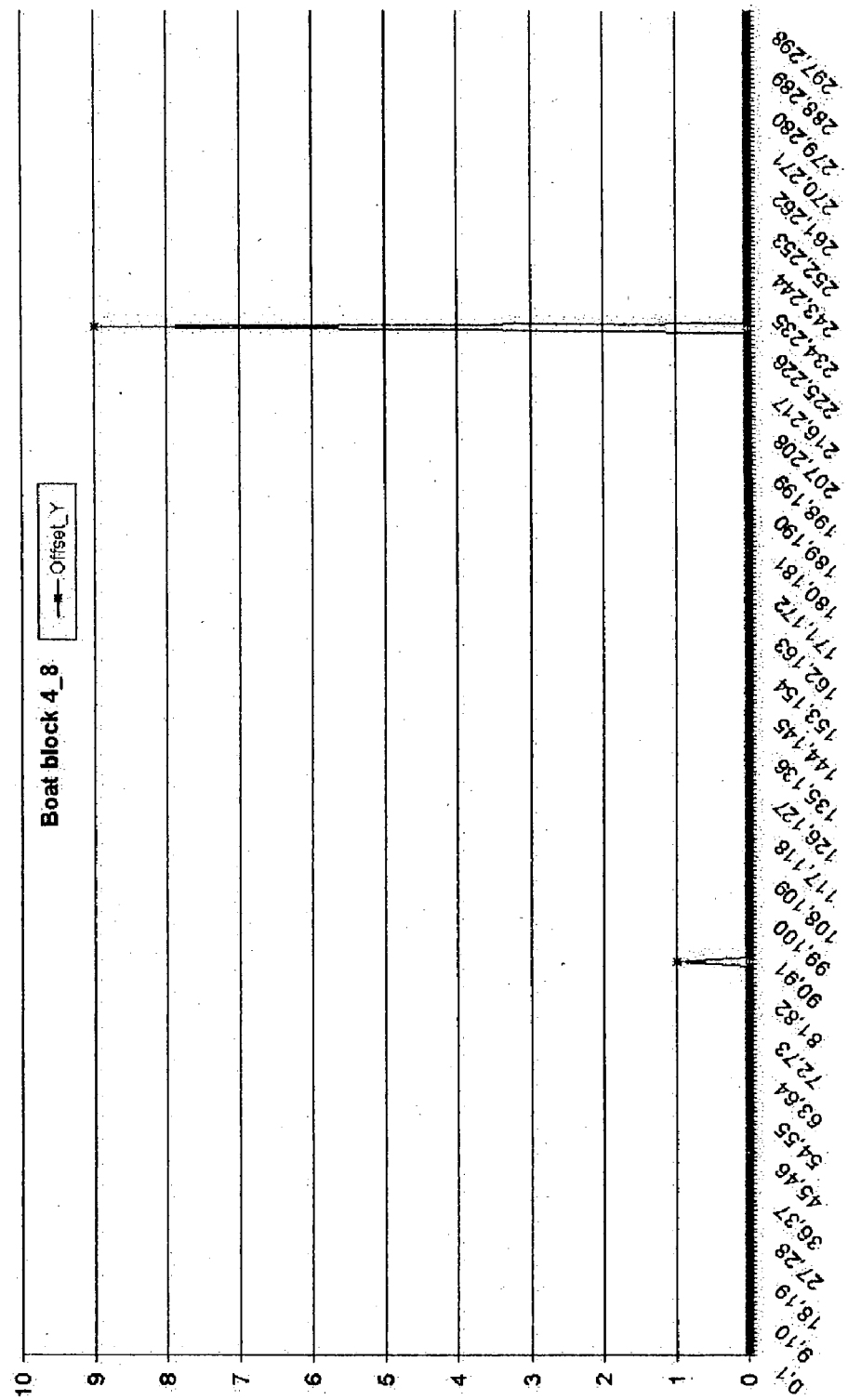
FIG. 10C shows a graph depicting the correlation coefficient for the detached block 4-8 of a frame from a scene in the test movie "The Boat."
Figure 11:
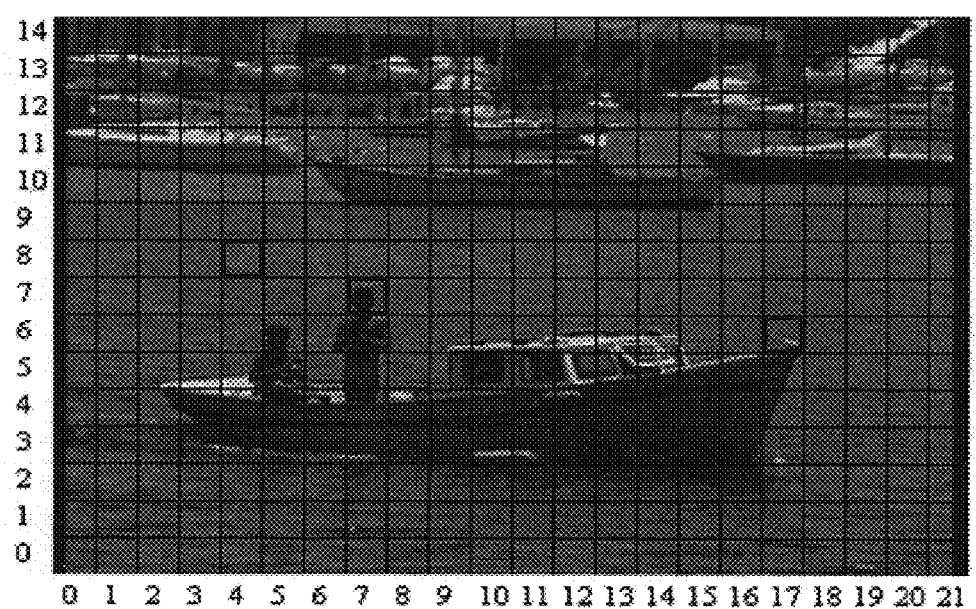
FIG. 11 shows a frame from a scene in the test movie "The Boat" with detached blocks 17-6, 7-7, and 4-8.

In FIG. 6, a graph of a sample correlation coefficient between successive images for the very dynamic and complex video film "Carnival" is shown. Again, the moments of subject change are sharply visible. It is characteristic that the correlation coefficient ranges insignificantly around 0.8. This agrees well with the fact that the film has a significant stochastic component.

A sample aggregate in the form of an image, in which pixels are elements, belongs to three-dimensional random space in accord with the standard YUV $\alpha:\beta:\gamma$. The aggregate of pixels of the image m×n in essence forms a three-dimensional sample of the m-dimensional spatial random series of magnitude n. The sequence of images of a video film forms a time series of the dimension m×n.

Each row of an image is a sample aggregate of a one-dimensional random process $\xi_i(x)$, where x is the distance of the pixel from the Y-axis, represented by a natural number. The random variable $\xi$ has a specific law of distribution, which is changed in time. One may propose that within the limits of all images of a scenario the law of distribution either is not changed or the values of its parameters are changed. During the transition to another scenario the law of distribution may be changed substantially.

The random spatial process $\xi_i(x)$ in general may be homogeneous as well as non-homogeneous. If it is changed as a function x, then $\xi_i(x)$ belongs to the class of non-homogeneous processes. Verification of $\xi_i(x)$ for heterogeneity is simple if the image is of sufficiently large dimensions. Moreover, from the aggregate of successive images for discrete $\xi_i(x)$ one may construct a large sample. This is possible when upon transition to the next image a distortion of the line i of the image or its fragment does not take place. Analysis of such processes is possible by the utilization of mathematical statistics.

One more problem is connected with $\xi_i(x)$. If $\xi_i(x)$ and $\xi_i(x+1)$ where k≧1 are not independent random variables, then it is customary to say that the spatial time process $\xi_i(x)$ has a residual effect of depth s, if $\xi_i(x)$ and $\xi_i(x+s-1)$ are dependent, but $\xi_i(x)$ and $\xi_i(x+s)$ are dependent The depth of the residual effect may be constant or variable. In the latter case the depth of the residual effect will be a random variable.

When examining the two related random processes, $\xi_i(x)$ and $\xi_{i+1}(x)$, one can see that, in general, they are sufficiently strongly correlated. For $\xi_i(x)$ and $\xi_{i+1}(x)$ with a sufficiently significant residual effect, the level of correlation will be significantly lower.

The correlation dependence between the lines and columns may be used as multi-dimensional metrics. The resolution of many problems of the approximation of predicted-frames for any global strategy for the transfer of information is connected to the presence of detailed information about the character of the correlation relationship between frames of the video film. In this case it is necessary to have available data about the character of the correlation relationship between successive images as well as frames partitioned into a group of frames. Information about the structure of the correlation dependence between the time series that form the distortions, brightness and color characteristics of the pixels, their groups, blocks, and images also is important. Such information may be obtained easily based on the strength of the simplicity of the construction of the given time series. During such correlation analysis, a problem may arise connected with the determination of the character of the displacement of a fragment of the image, during transfer from one frame (of the image) to the next.

No less important is the information about the structure of the correlation dependence between elements of the image, as which objects, blocks and subsets of pixels usually are examined. Intra-frame correlation relationships reflect both changes in single elements of an image, as well as changes in other elements of the same configuration and the structure of the same frame (image). A correlation coefficient of this type is a random variable on the strength of its sample value, and moreover it is a function of the number of the frame, i.e. a function of time.

The diversity of all of the examined types of correlation relationships permits one to more effectively solve the problem of motion estimation. This especially relates to the use of methods of analysis of time series for the prediction of complex events, which may arise in the process of the change of scenes in accord with the subject of the video films.

One more trend for the use of correlation analysis is the description of mechanisms for the transfer of information between successive images and the evaluation of its magnitude.

A sample correlation coefficient between two adjacent frames is calculated in the most simple case with the help of the expression:

$$r_{ij} = \frac{\sum_{s=1}^{m}\sum_{l=1}^{n}\{\xi_{sl}(i)-\overline{\xi}(i)\}\{\xi_{sl}(j)-\overline{\xi}(j)\}}{\sqrt{\sum_{s=1}^{m}\sum_{l=1}^{n}\{\xi_{sl}(i)-\overline{\xi}(i)\}^2 \cdot \{\xi_{sl}(j)-\overline{\xi}(j)\}^2}},$$

where $\xi_{sl}(i)$, $\xi_{sl}(j)$ are brightness values of pixels with the coordinates (s, 1) in images i and j, and $\overline{\xi}(i)$, $\overline{\xi}(j)$ are the values of the mathematical mean value of the brightness of the pixels in these images.

Calculation of the sample value $r_{ij}$ in accord with the indicated formula is sufficiently simple from a calculation point of view, inasmuch as between the pixels of two images a sufficiently simple natural mutually unique correspondence is established. However, this expression does not precisely reflect the level of correlation dependence between the given images, inasmuch as the selected mutually unique correspondence between pixels does not take into the following into account: (1) the displacements of several pixels relative to its standard; (2) the exit of a series of pixels beyond the limits of the image; and (3) the appearance of new pixels as a result of the processes of movement of the camera and the objects and the distortion of objects during the interaction.

The mutually unique correspondence between pixels of the i and j frames, taking into consideration all factors of movement, can be found with the assistance of sufficiently complex combinatorial-statistical calculation algorithms. If the displacement outside the limits of the image or the displacement within the limits of the image is calculated, it will not encompass the entire set of pixels. The value of the correlation coefficient on the basis of the new mutually unique correspondence between the pixels will more precisely reflect the exchange of information between two images.

The precision of the evaluation of the inter-frame interaction depends not only on the distance between reference frames, but also on the model of information transfer using the predicted-frames approximation. The process of approximation of blocks and images as a whole to a significant degree depends on what portion of information from the approximating blocks is preserved during the inter-frame interaction. This variable permits evaluation of the distance between reference frames and the magnitude of the bit rate for the given fragment of a sequence of images.

The quality of compression of a video sequence to a significant degree also depends on the approximating images. For the duration of the entire video sequence the dynamics and structure of the transfer of information both as qualitative as well as quantitative relationships may be changed. Therefore during the compression of a video sequence there may arise the necessity of changing the model of information transfer to predicted-frames. The source of the data about the effectiveness of information exchange in the selected model of information transfer to predicted-frames is the sequence of correlation coefficients between the given predicted-frame data and the approximating images, used in correspondence with the model of transfer.

If for the predicted-frame the correlation coefficient of the predicted-frame with the given set of images, determined by the model of the transfer of information to each other, will be less than the given variable, then this indicates that it is necessary to correct or radically change the model of information transfer. The most challenging trend for the transfer of information to the predicted-frame is the transfer from the reference and the already approximated predicted-frames, distributed between the backward-frame and the current predicted-frame. The transfer of information in this model of control is determined by the character of the decrease of the correlation coefficient between the backward-frame and each subsequent frame.

For example, one can examine the sequence of correlation coefficients $r_{11}, r_{12}, \ldots, r_{1k}, r_{k+1}, r_{k+2}, \ldots$ for the entire video sequence, where k1, k2 . . . are moments of subject change, in the graph of such a sequence of correlation coefficients for the film "The Boat" (which contains three subjects and is shown in FIG. 2). In the part of the film containing the first subject, with $r_{1-6}$, the correlation coefficient falls to the level of 0.6. This indicates that already the seventh frame essentially may not obtain reliable information necessary for its qualitative approximation from the preceding frames. It is possible to confirm that only the stochastic component of this sequence of frames remains. Partial correlation coefficients are confirmation of this. If $r_{12}>r_{13}>r_{14}$ is given, calculation of $r_{13-2}$ and so on is possible. If the values become close to zero, this indicates that the determinate component, through which the exchange of information between the first and third frames, and so on, takes place, is removed. Partial correlation coefficients are calculated with the help of the relationships:

$$r_{xy\cdot z} = \frac{r_{xy} - r_{xz}r_{yz}}{\sqrt{(1-r_{xz}^2)(1-r_{yz}^2)}}$$

where $r_{xy}$, $r_{xz}$, $r_{yz}$ are simple correlation coefficients.

Figure 12:
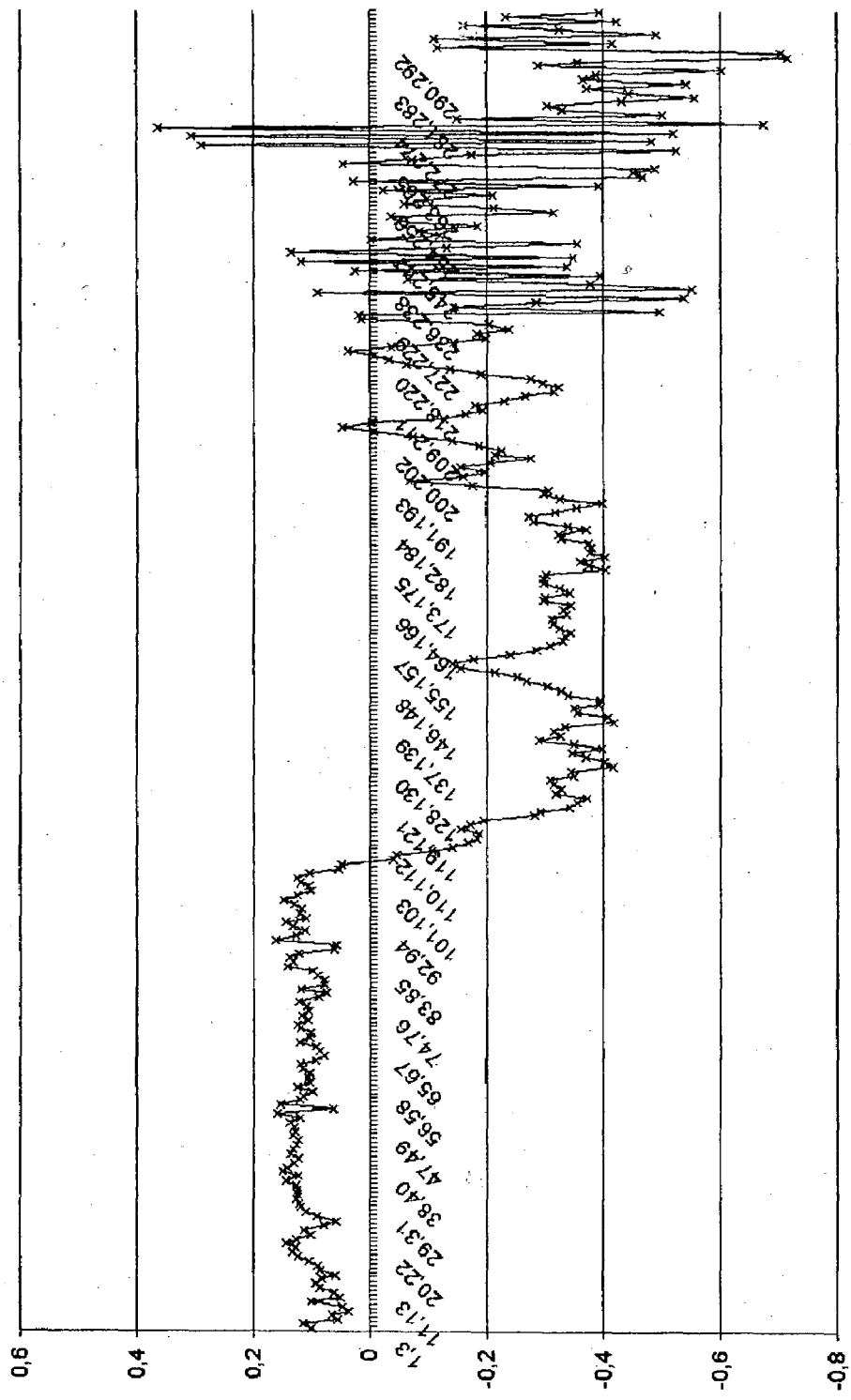
FIG. 12 shows a graph of partial correlation coefficients for the film "The Boat."

In FIG. 12 a graph of partial correlation coefficients for the film "The Boat" is shown. The first fragment shows that removal of the influence of the second frame essentially leads to the fact that the first and third frames are not correlated. In fragment three, on the strength of large values, $r_i$, $r_{i+1}$, $r_{i(i+2)\cdot(i+1)}$ even take on negative values. This points to the fact that the common part of frames i+1, i, i+2 is so large that removal of the influence of i+1 leads to the elimination in frames i and i+2, along with the common component, of dissimilar components, which gives rise to a low correlation.

Since $r_i$, $r_{i+}$ decreases very slowly, for this subject, and does not fall lower than 0.85, one may use only two reference frames for 110 predicted-frames. During this time the degree of compression of this fragment of the video sequence is significantly increased.

During the resolution of the tasks of compression of a video sequence there are common cases when it is necessary to calculate the performance dynamic of a group of pixels. Each pixel in a sequence of frames generates a time series of either displacement, brightness or color diversity. The set of all such series permits one to compute a matrix of correlation relationships between the pixels of the given set. If in some region the correlation coefficients are significant, then one may sufficiently precisely predict the performance dynamic of specific subsets of pixels.

Resolution of this problem is especially important in the case of the distortion of separate fragments of images. The approximation of blocks that include distorted fragments is problematic when it occurs in irregular moments in time for a small number of frames. Methods for predicting the dynamics of change of brightness and the spatial displacement of isolated groups of pixels allow the processes of distortion to be described sufficiently.

The trajectory of movement of the pixels reflects the direction of movement of the blocks. By predicting the movement of groups of pixels, one can predict the direction of the displacements of blocks or objects, and thereby obtain the possibility of finding the optimal displacement of the blocks, not using methods of a full search, a zonal search, 4SS or other search strategies of a quasi-optimal minimum.

It should be noted that the correlation coefficient reflects what portion of dispersion of a random size may be described through another variable. The remaining dispersion is described by the relationship: $\sigma^{*2}=\sigma^2(1-r^2)$, where $\sigma^{*2}$ is the remaining dispersion. In the case examined herein, the role of variables describe the approximating and approximated images.

The dispersion $\sigma^2$ for an image describes the dispersion of a random variable $\xi$, which reflects the dynamic of change of the brightness of the image pixels. The brightness of each pixel represents some selected value of a random variable. In the case of images the selection does not consist of independent experiments. The selected values are dependent. The structure of the dependence of the selected values is quite complex. Therefore the correlation coefficient between two successive images describes the character of the relationship between them without the de-correlation of the pixels of the image.

Figure 15:
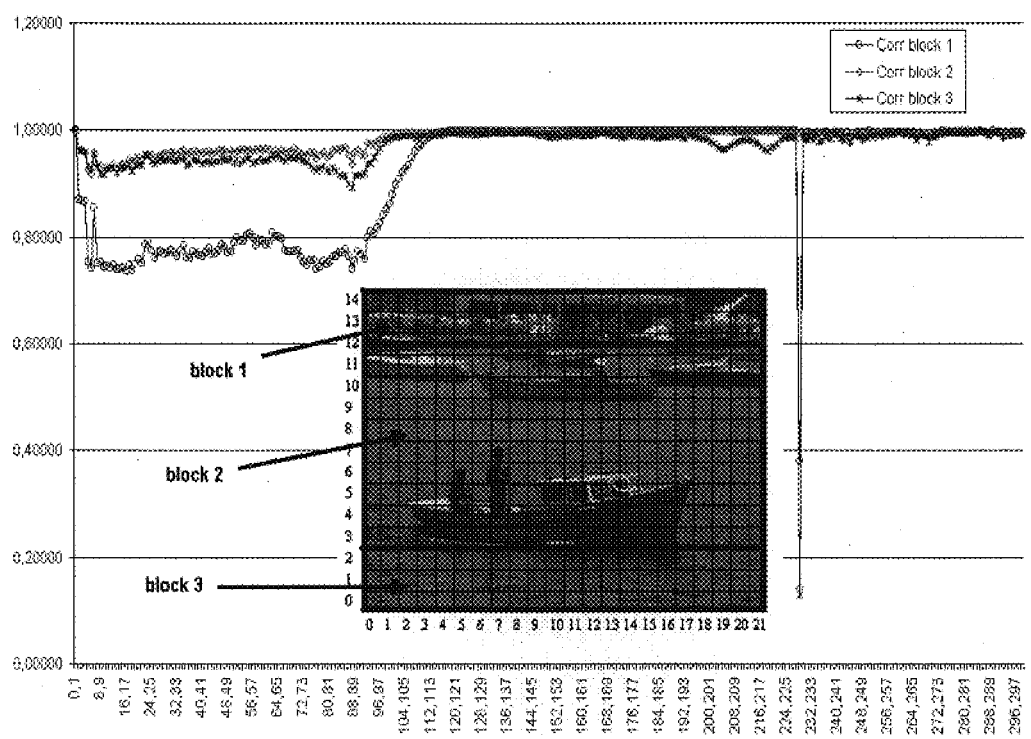
FIG. 15 shows a graph illustrating the behavior of the determinate and stochastic parts of the frames for the film "The Boat."

The fragments of images that correspond to objects undergoing various changes in the course of a scenario carry a larger informational load during the inter-frame interaction than objects that possess a static (or determinate) behavior. In FIG. 15 the behavior of the determinate and stochastic parts of the frames for the film "The Boat" are shown. Complete information about the inter-frame interaction may not be obtained on the basis of comparative analysis of adjacent frames. An in-depth analysis of the temporal interaction of frames spreading upon necessity to all frames of the scenario, is necessary.

Such an analysis cannot be effectively implemented with a pair-by-pair analysis of adjacent frames or of small groups of frames. Precise information may be obtained only through the processing of all frames of a scenario. It is obvious that in the interactive models of video compression applications of methods for isolation of scenarios and their detailed analysis either is practically impossible or requires the application of special apparatuses that possess large calculating power and a high degree of parallelization of calculation processes.

In such cases where pre-processor analysis of the video is possible, the application of methods of stochastic and correlation analysis permit one to obtain additional information about the video, which permits one to significantly increase the degree and quality of the video compression.

Correlation analysis improved the effectiveness of the video compression methods. This is especially true for moments of scenario change in a video film. The change may take place gradually or rapidly within 1–2 frames. The system of inter-frame interaction must be customized per a specific scenario change regime beforehand. Additionally, the change of scenario must be correctly identified.

In the case of a gradual transition from one scenario to another the overlap of the scenes of two scenarios may occur. Then another approach to the evaluation of the quality of the approximation of the images is necessary. As for the transition to the new scenario, the metric for evaluating the quality of the approximation must be adapted to the even more sharply developed images of the new scenario.

For a sharp change of scenario the need arises to include the first frame of the new scenario as a reference frame. Non-fulfillment of this condition leads to the effect of garbling the first frames of the new scenario, which is noticeable when viewing the video.

Each video film can be characterized as a sequence of scenarios (subjects) $S_1, \ldots, S_n$, each of which has a specific sequence of scenes. The number of scenes in a scenario determines its length. According to the teachings of the current invention, a scene is composite if it belongs simultaneously to two adjacent scenarios, and the number of composite scenes for two successive scenarios is the length of the transitional scenario.

If the length of the transitional scenario is equal to zero, the change of scenario is abrupt. Models for the transfer of information may be separated into four basic classes:

the distance between reference frames is constant during compression of the given subject, but may change upon transition to other subjects;

the distance between reference frames for a given subject is constant, but the model for the exchange of information between the predicted-frame and other frames including backward and forward frames may change within the limits of one subject;

the distance between reference frames is variable and is determined for each scenario;

both the distance between reference frames and the models for information transfer changes within one subject.

The choice of a model depends substantially on the dynamics of the scenarios and the distribution of moments of time of abrupt or gradual scenario changes. Obviously, in the majority of cases the application of the adaptive approach is justified. The cases where transitions between scenarios are gradual constitute the exception. In this case the application of models with a constant distance between the reference frames is advisable.

In general when using motion estimation the selection of the distance between reference frames will mostly have an adaptive character. The more average the distance between the reference frames is, the greater the degree of compression it is possible to attain. The obtained visual quality of the images depends to a significant degree on the completeness of the information about the structure of the stochastic relationship between adjacent images.

Resolution of the problem of the arrangement of reference frames at each stage of motion estimation is related to the selection of the next reference frame that follows from the last reference frame used. From the point of view of increasing the degree of compression it is desirable that the distance between them be as large as possible, but the unfounded increase of this distance inevitably leads to an increase in the loss of information, and, as a result, to the deterioration of the viewer's perception of the video.

Figure 13A:
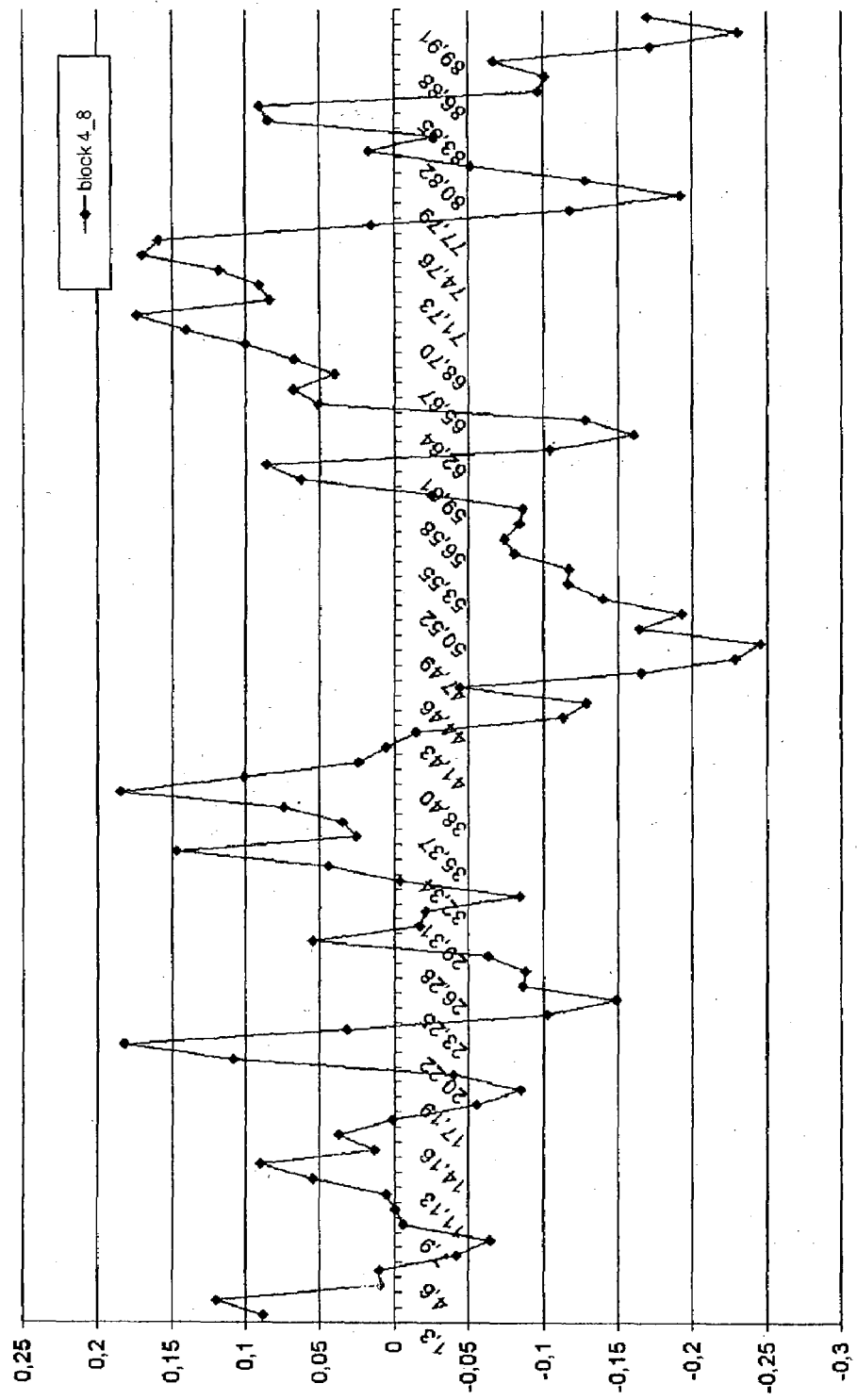
FIGS. 13A–13C show a series of graphs of the character of the performance of partial correlation coefficients for separately taken blocks.
Figure 13B:
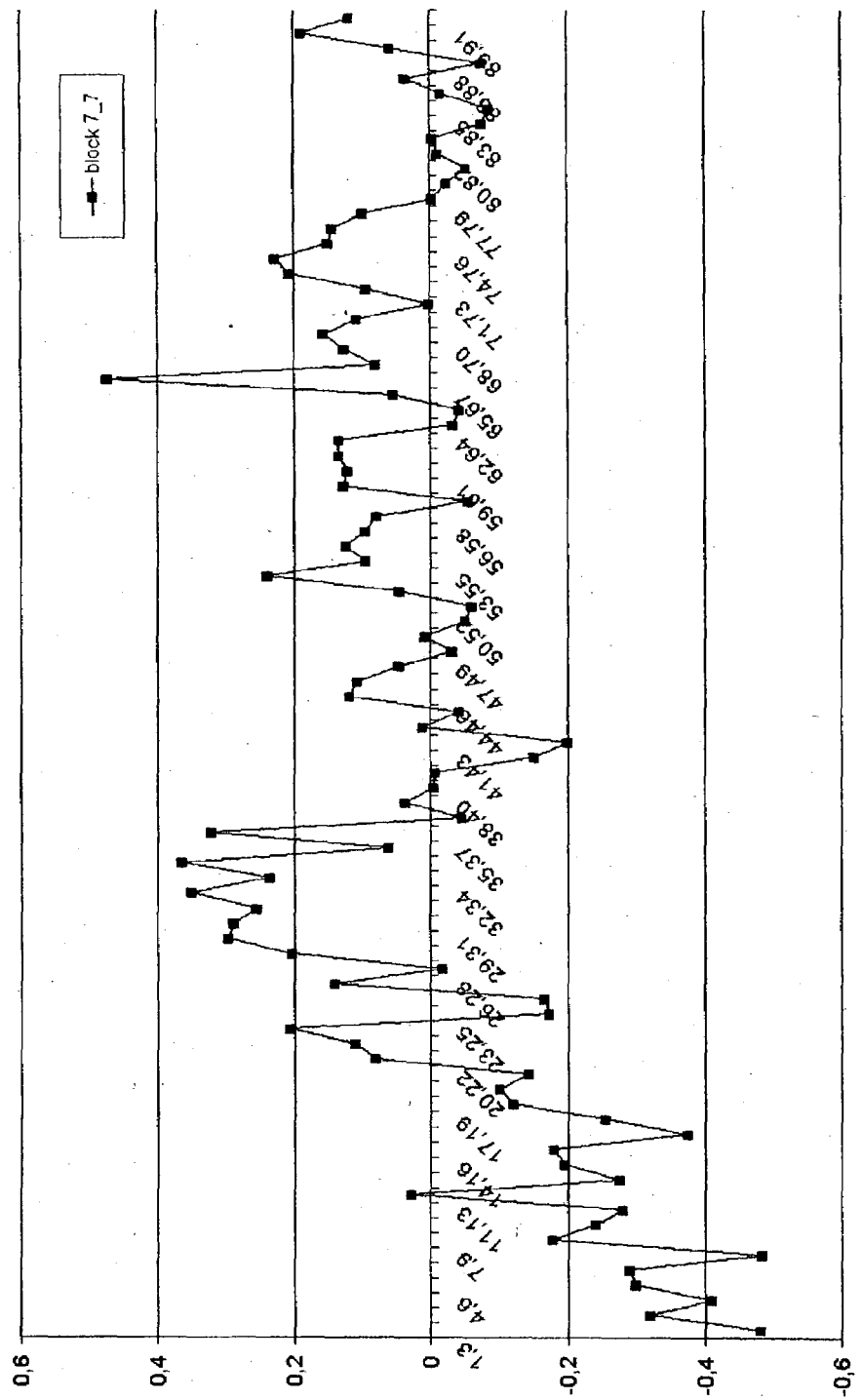
Figure 13C:
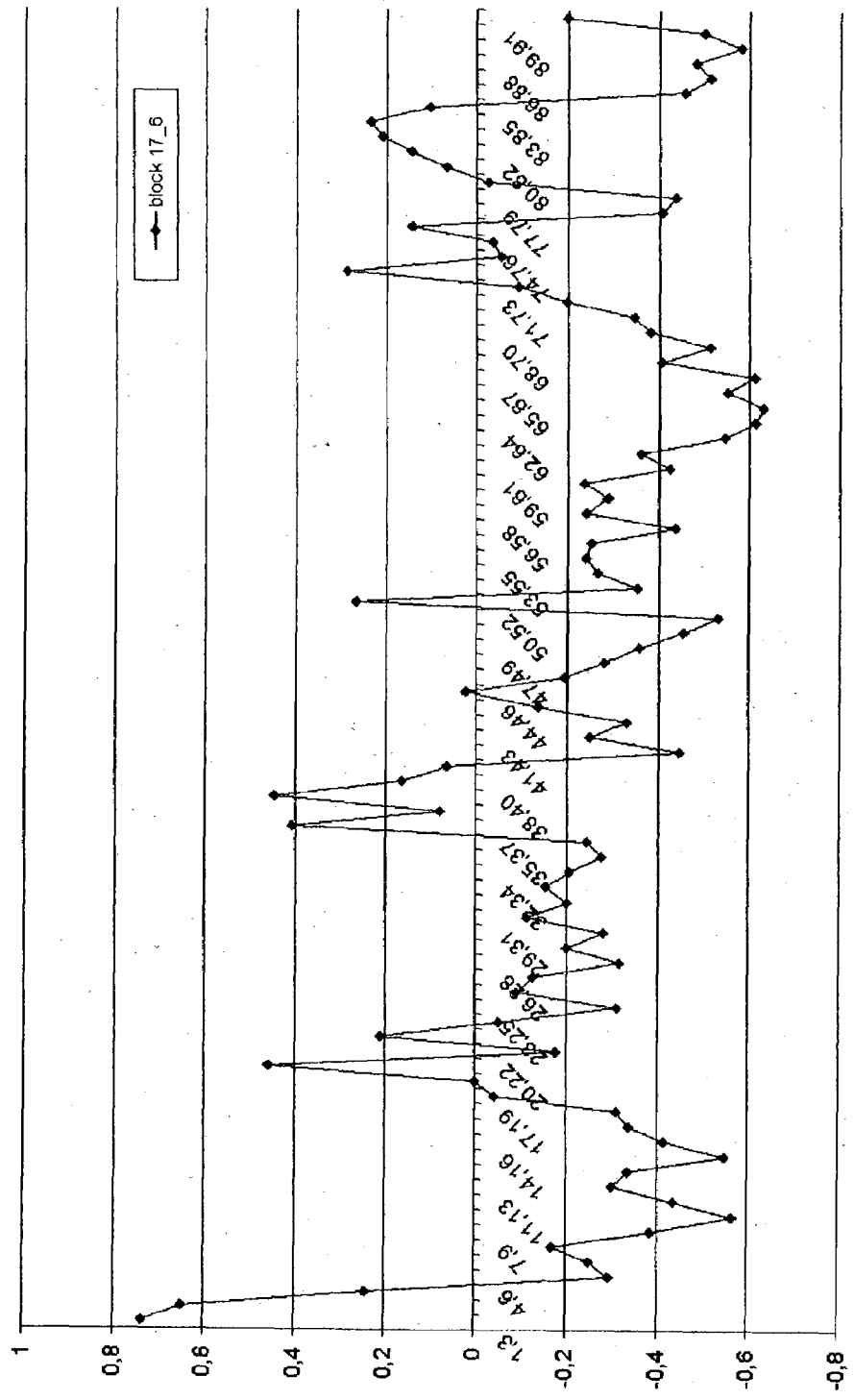

The creation of a system of video compression, to a maximal degree ensuring the greatest degree of compression and minimal losses, requires the fulfillment of these assumptions:

the set of pixels for each block may be examined as a sample aggregate;

the set of pixels for each isolated block may be examined as an object of the real world;

any block within the limits of an individual scenario is moved along some trajectory, which reflects the dynamic of its behavior (FIGS. 13A–13C).

Within the limits between two reference frames, the distortion of a block does not have a radical character (i.e. the structure is preserved, distortions of the object in the block are insignificant, etc.);

The influence of the stochastic component of the distortion is significantly less than that of the determinate component;

The transposition of a block from frame to frame takes place along some trajectory, which does not take the block beyond the limits of the frames arranged between reference frames.

Figure 14:
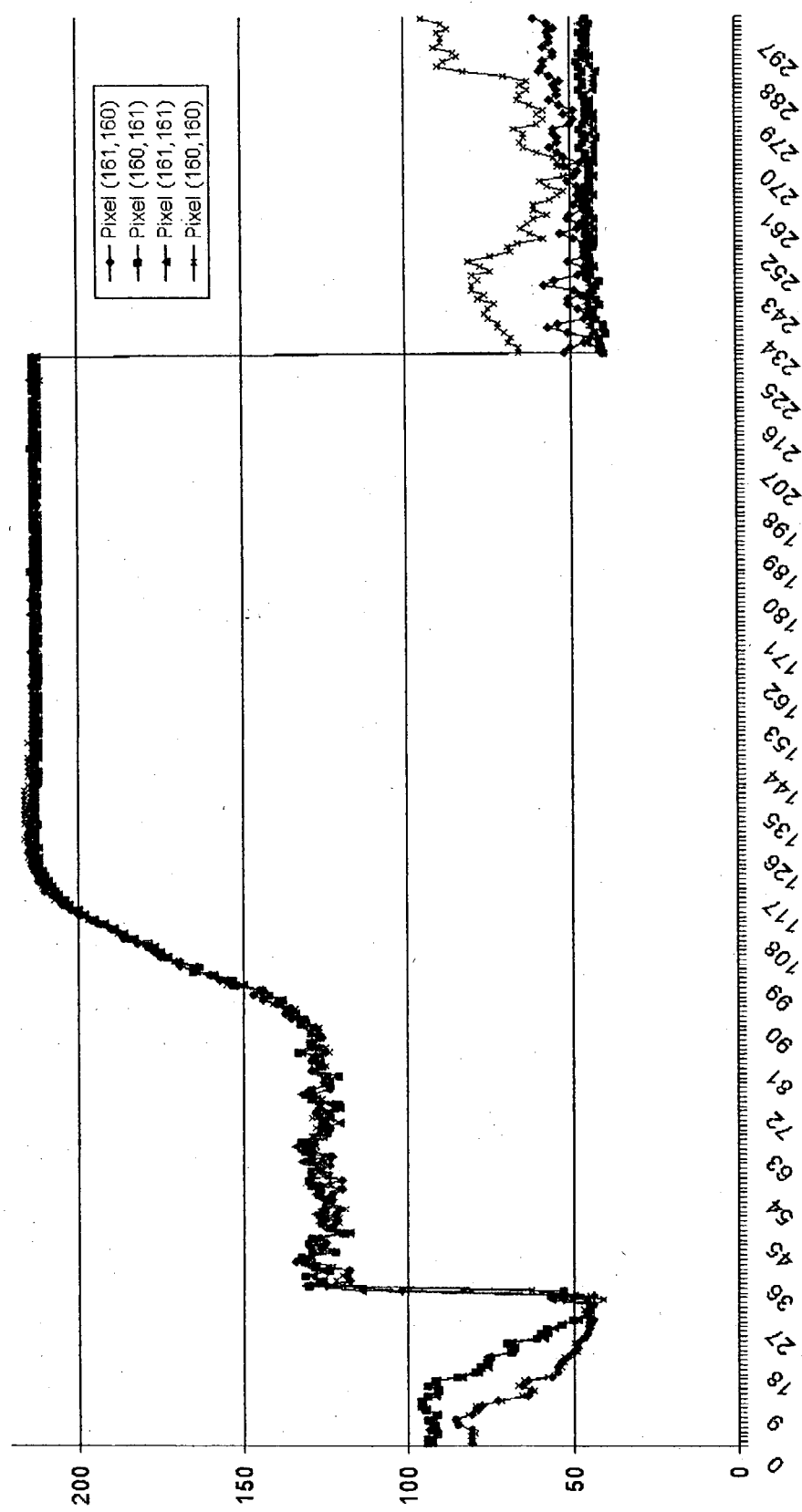
FIG. 14 shows a graph depicting the correlation series of a block from four pixels of the test film "The Boat."

In FIG. 14 selected correlation series of a block from four pixels of the test film "The Boat" are shown. It is obvious that within each scenario the dynamic of the series for different pixels practically coincides.

The first case means that objects of a scenario are found in complex movement, or they are subjected to continual deformation and as a result a continual process of reconstruction of the scenes—and, as a result, the inter-frame interaction is decreased. The selected correlation coefficient is approximated well by the function of the density of the probability distribution.

Using the function of the density of distribution, it is easy to evaluate the number of successive images between two reference frames.

In the second case, on the interval of the decrease of the sample correlation coefficient one may use the same principle, while on the linear part one may use Shannon's measure of the degree of uncertainty, or some transformed schemes of the proposed method.

The presented description of the distance of reference frames has an approximate character. A fully precise description may be obtained if one were to examine an entire set of blocks $\{B_1, B_2, \ldots, B_N\}$, the quantity of which is more than 300. Analysis of the entire aggregate of random processes of change of the sample value of the correlation coefficients is a significantly complicated calculation.

Moreover, the examined system of blocks is attached to the standard network of splittings. One may obtain additional information if a network is used with splittings not only of a quadratic or rectangular form. The primary point is that in each block either some set of objects or their fragments or their texture is localized. Unfortunately, the transition to such splittings requires a large number of calculations.

The distance between reference frames is determined by the number of images (frames) between them. The pair-by-pair correlation coefficient between successive frames between two reference frames thus is no less than the determined threshold. The approximation of blocks on the edges of images is an important problem of motion estimation.

For the resolution of the problem of the description and analysis of the dynamic of one pixel it is worthwhile to isolate a block of minimal size, in the center of which the pixel to be analyzed is located. Since adjacent pixels are sufficiently tightly connected by the stochastic relationship between them, the dynamic of displacement of a block reflects the dynamic of displacement of the central pixel. This is true on the condition that the displacement of the block is determined sufficiently precisely. If all pixels in the block with a specific degree of approximation have one and the same trajectory of displacement, one can obtain a time series of the dynamic of change of brightness for each pixel. On the basis of the time series of the displacement of the block one can find, with the help of methods of prediction, the most probable vector of its displacement on the edge of the image. Multiple time series of the change in brightness of the pixels permit one to find a new state in which the block will transition.

The method of correlation and statistical analysis of a video sequence, discussed herein, permits one to substantially improve the quality of the evaluation of inter-frame interaction. In the approximation of images the transfer of information between frames is an important mechanism. The method, disclosed herein, possesses the distinction that it includes an aggregate of procedures (functions) which may be either constantly included in the encoder, or which may be switched on when necessary.

Procedure 1. Isolation of subjects of the video film.

Step 1. Calculate the function of the correlation relationship between successive frames:

$$r_{i,i+1}(n) = \frac{Cov(I_i, I_{i+1})}{\sqrt{D(I_i)D(I_{i+1})}}$$

with the assumption that the mutually uniquely valued correspondence between the pixels is used.

Step 2. Find all images $I_k$ and $I_{k+1}$, for which $r_{k,\,k+1} \leq \delta$, where $\delta$ is a sufficiently small variable, establishes that between the given frames the correlation relationship is very small (is practically absent).

Step 3. Isolate all $k_1, \ldots, k_m$, for which the condition of step 2 is met. These values present themselves as points in which an abrupt change of subject takes place.

Step 4. Determine the gradual changes of scenario. Let us suppose that the prolonged change of scenario is represented by frames $l_1, \ldots, l_m$, which are specified as frames, during which $r_{i,i+1}$, decreases to $\delta$.

Step 5. Isolate $r_{i,i+1}$, exactly equal to 1, which unambiguously indicates that neighboring frames are duplicated. Eliminate one from each pair of the duplicated frames. If a group of duplicated frames are present, then eliminate all except one.

Procedure 2. The arrangement of reference frames.

Step 1. Suppose that scenario k is examined, which includes frames k to k+q, where q is the number of frames in scenario k.

Step 2. Calculate the sequence of the correlation coefficients $r_{k,k+1}, r_{k,k+2}, r_{k,q}$ to the point where $1-r_{k,k+p} \leq \delta_k$, where $\delta_k$ is the threshold of correlation dependence, during which the transfer of information from backward-frames and approximated predicted-frames is sufficient for compensation for the information lost in a predicted-frame with a number less than k+p.

Step 3. Select frames with numbers k and k+p as backward-frames and forward-frames.

Step 4. Select an approximation model by means of the transfer of information from the backward-frames and forward-frames, depending on the magnitudes of the differences $1-r_{k,k+p}$ for each predicted-frame.

Step 5. Evaluate the quality of the approximation of the predicted-frame with the number k+i, using a multiple-criterion metric. If the quality of the approximation in accord with the metric satisfies the given conditions, then move on to the next k+i+1 predicted-frame. If this is not satisfied, move on to step 6.

Step 6. Isolate blocks in the predicted-frame k+i for which the multiple metric gives a level of error that does not satisfy the conditions for the required quality of the approximation. One can use a function for the selection of an optimal model of approximation, which may include quadratic splitting of blocks and even re-encoding. Select a new predicted-frame k+i+1. If it is equal to k+q, that is if it coincides with the forward-frame, then move on to step 1, and if the forward-frame is not attained, then move to step 3.

Procedure 3. Determination of the rate of information exchange between successive frames of one scenario.

Step 1. Calculate the sequence of the correlation coefficients: $r_{ii}, r_{i,\,i+1}, r_{i,\,i+n}$. for the selected scenario, occupying frames from $I_k$ and $I_{k+n}$ Step 2. Calculate the value of the limit of this sequence:

$$r_{i*} = \frac{1}{n-k}\sum_{j=k+1}^{n} r_{ii+j}$$

Step 3. Determine the probability:

$$P(|r_{is}\ r_{i*}|<\epsilon)$$

Using the function of the density of distribution probability with the normal law of distribution:

$$f(r) = N\frac{1}{2}\ln\frac{1}{1+r_{i*}}\frac{r_{i*}}{,}\ \frac{1}{M-3},$$

where $r_{i*}$ is the precise value of the limit, $r_{i,\,i+k}$, M is the size of the sample, on the basis of which $r_{i,\,i+k}$ is evaluated. The term $\epsilon$ is given as the permissible magnitude of range $r_{is}$ relative to $r_{i*}$. Then the probability $P(|r_{is}-r_{i*}|<\epsilon)$ is determined by the ratio:

$$P(|\,r_{is}\quad r_{i*}|<\varepsilon) = \int_{r_{i*}\ \varepsilon}^{r_{i*}+\varepsilon} \varnothing(r)dr.$$

Step 4. If $P(|r_{is}\ r_{i*}|<\epsilon)>\delta$, then $r_{i*}$ is applied as the limit value. The threshold $\delta$ is given. The term $r_{i*}$ is considered as an index of the existence of the common determinate center for all frames of the examined scenario.

Step 5. Calculate the sequence of partial correlation coefficients:

$$r_{i,(i+2)\cdot(i+1)},\ r_{i,(i+2)\cdot(i+1)},\ r_{i+1,(i+3)\cdot(i+2)}\ \cdots\ r_{i+k,(i+k+2)\cdot(i+k+1)}.$$

Find the limit value $r_{j,(j+2)\cdot(j+1)}$ as in the case of $r_{is}$, having designated it $r_{j*}$. If $r_{j*}$ is close to zero, then it confirms the presence of a common determinate core in all frames of the scenario. The closer $r_{j*}$ is to zero, the greater the distance between reference frames that may be chosen while preserving the quality of the compression.

Procedure 4. Determination of the speed of the movement of complex objects relative to the video camera with the help of the hyperblocks containing them.

Consider cases where the complex object is already isolated in the scenario (methods for isolating objects are not considered in this application). Assume that a minimal hyperblock of size m×n, containing the object, is constructed. Each column of pixels is a sample value of an m-dimensional random variable as a function of distance. Let us consider two successive frames $I_i$ and $I_{i+1}$.

Step 1. Displace the isolated hyperblock l pixels to the left (or right). At the same time l takes on a value from 1 to $$\frac{l}{2} - q.$$

Step 2. Construct a mutually uniquely valued ratio between pixels after elimination from the hyperblock $I_i$ of frame l of the first columns and from block $I_{i+1}$ of frame l of the last columns.

Step 3. Calculate the correlation coefficients for various l (that is, for various displacements). One will obtain two sequences of correlation coefficients:

$$r_{i,i+1}^{-1}, r_{i,i+1}^{-2}, \ldots r_{i,i+1}^{-(\frac{l}{2}-q)}\quad r_{i,i+1}^{+1}, \ldots, r_{i,i+1}^{\frac{l}{2}-q}.$$

Figure 16C:
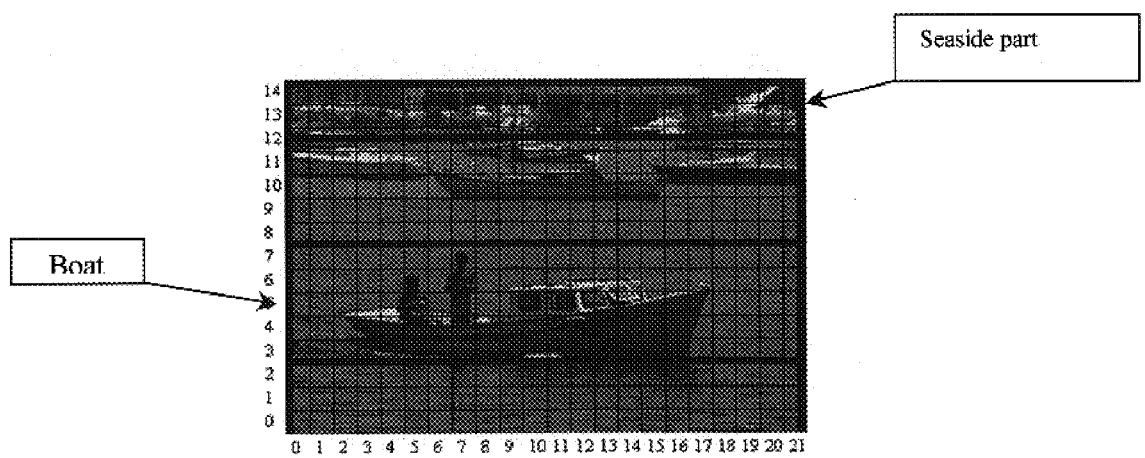

Step 4. Find the greatest in terms of absolute magnitude value $r_{i,i+1}$. The value j determines the speed of the movement of the object relative to the camera for one frame. If j<0, then the object moves to the left, if the opposite is the case, then to the right. In FIGS. 16A and 16B the isolated hyperblocks, corresponding to objects such as the bridge and the boat in FIG. 16C, are shown. In the tables in FIGS. 17A and 17B, the values for the correlation coefficients corresponding to different displacements of the hyperblocks are shown. For the boat displacement is zero, which indicates that the camera is expressly following its movement. It is obvious that the dock moves relative to the bridge with a speed of 3 pixels per frame.

Procedure 5. Conduct analysis of the stochastic relationship between blocks and separate pixels within the limits of one subject.

One can examine the dynamic of change of the characteristic (displacement along x and y, brightness, intensity) of an individual pixel during transition from one image to another. In the given scenario, each such characteristic determines a time series with the laws of the change of dynamics, determined by the governing laws of the scenario. However, it is more convenient to examine, instead of one pixel, a block measuring 3×3 or 5×5, in the center of which the examined pixel is located. With acceptable precision, one may consider that the magnitude of displacement of the pixel coincides with the magnitude of displacement of a corresponding block of the examined dimensions.

Step 1. Construct an array for the splitting of images into blocks of the given structure.

Step 2. Calculate a matrix of the pair-by-pair correlation relationship between series of blocks relative to the selected characteristic. Obtain the matrix:

$$R_f = \|r_{ij}\|_{kk},$$

where k is the number of blocks, and f is the examined characteristic.

Step 3. Construct the splitting of matrix into groups of blocks in accord with the criterion:

$$F_f(A_1, A_L) = \sum_{S=1}^{L} \frac{1}{|A_S|^2} \sum_{i,j \in A_S} |r_{ij}^f|,$$

where $|A_S|$ is the number of blocks in the group S.

Step 4. Use the set $\{A_I, A_L\}$ for adjustment of the selection of the optimal approximable block, if they belong to one group. Moreover, groups of strongly correlated blocks reflect the character of the exchange of information between images.

The methods disclosed in the current application can be executed or preformed in a computer, other microprocessors, programmable electronic devices or other electronic circuitry used for video compression. They can be loaded into the above devices as software, hardware, or firmware. The given methods can be implemented and programmed as discrete operations or as a part of a larger video compression strategy.

INDUSTRIAL APPLICABILITY

The invention has applicability to the field of video sequence compression technology; in particular, this invention describes methods of achieving video sequence compression through the described methods of motion estimates and correlation to significantly compress video and other frame-related interactions.

In compliance with the statute, the invention has been described in language more or less specific as to structural features. It is to be understood, however, that the invention is not limited to the specific features shown or described, since the means and construction shown or described comprise preferred forms of putting the invention into effect. Additionally, while this invention is described in terms of being used to provide compression of video data, it will be readily apparent to those skilled in the art that the invention can be adapted to other uses as well. The invention should not be construed as being limited to video frame compression and is therefore, claimed in any of its forms or modifications within the legitimate and valid scope of the appended claims, appropriately interpreted in accordance with the doctrine of equivalents.

What is claimed is:

1. A method for analyzing the inter-frame interaction in a video film having a dynamic sequence of images, comprising the steps of:
    1) adapting a video encoder to include procedures for correlation and statistical analysis of a video sequence, said video encoder adapted to include procedures for correlation and statistical analysis that perform operations comprised of:
        a) isolating of subjects of the video film;
        b) arranging reference frames;
        c) determining the rate of information exchange between successive frames on one scenario;
        d) determining the speed of movement of complex objects relative to the video camera; and
        e) conducting analysis of the stochastic relationships between blocks and separate pixels within the limits of one subject
    2) executing the procedures for correlation and statistical analysis during the encoding of a video film.

2. The method of claim 1 wherein the procedures for correlation and statistical analysis are constantly executed during the encoding of a video file.

3. The method of claim 1 wherein the procedures for correlation and statistical analysis are executed on an as needed basis.

4. A method for analyzing the interframe interaction in a video film having a dynamic sequence of images, comprising:
    a) isolating subjects of the video film by the steps of
        1) calculating the function of the correlation relationship between successive frames;
        2) finding images in successive frames that have a small correlation relationship;
        3) isolating frames into groups which have small correlation relationship;
        4) determining gradual changes of scenario
        5) isolating duplicate or groups of duplicate neighboring frames and eliminate all but one duplicate frame
    b) arranging reference frames to form a sequence of scenarios
    c) determining the rate of information exchange between successive scenarios
    d) determining the speed of movement of complex objects relative to the video camera
    e) conducting analysis of stochastic relationships between blocks and separate pixels during transition from one image to another; and
    performing video compression based upon results of steps a–f.

* * * * *